United States Patent
Jin et al.

(10) Patent No.: US 12,015,844 B2
(45) Date of Patent: Jun. 18, 2024

(54) APPARATUS AND METHOD FOR PROVIDING FINGERPRINT RECOGNITION AND PHOTOGRAPHING BASED ON UNDER DISPLAY CAMERA IN ELECTRONIC DEVICE

(71) Applicant: Samsung Electronics Co., Ltd., Gyeonggi-do (KR)

(72) Inventors: Intae Jin, Gyeonggi-do (KR); Dasom Lee, Gyeonggi-do (KR); Juwoan Yoo, Gyeonggi-do (KR); Wonsuk Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 17/875,663

(22) Filed: Jul. 28, 2022

(65) Prior Publication Data

US 2023/0035206 A1 Feb. 2, 2023

Related U.S. Application Data

(63) Continuation of application No. PCT/KR2022/010539, filed on Jul. 19, 2022.

(30) Foreign Application Priority Data

Jul. 27, 2021 (KR) .................. 10-2021-0098546

(51) Int. Cl.
*H04N 23/667* (2023.01)
*G06V 40/13* (2022.01)
*H04N 23/55* (2023.01)

(52) U.S. Cl.
CPC ....... *H04N 23/667* (2023.01); *G06V 40/1318* (2022.01); *H04N 23/55* (2023.01)

(58) Field of Classification Search
CPC .... G06V 40/1318; G06V 40/40; H04N 23/55; H04N 23/57; H04N 23/667
See application file for complete search history.

(56) References Cited

U.S. PATENT DOCUMENTS

| 10,303,921 B1 | 5/2019 | He et al. |
| 11,048,306 B2 | 6/2021 | Kwak et al. |

(Continued)

FOREIGN PATENT DOCUMENTS

| CN | 107071244 A | 8/2017 |
| CN | 109496311 A | 3/2019 |

(Continued)

OTHER PUBLICATIONS

International Search Report dated Nov. 2, 2022.

*Primary Examiner* — Mohammed S Rahaman
(74) *Attorney, Agent, or Firm* — Cha & Reiter, LLC

(57) ABSTRACT

The electronic device according to an embodiment may include a display module, a UDC module, and a processor. The processor may operate to identify an operation mode of the UDC module. The processor may operate to change, when the operation mode is a first designated operation mode, transmittance of a UDC area in a display area of the display module, control the UDC module to configure a first path facing the sensor module, and obtain a first image based on light transferred to the sensor module. The processor may operate to change, when the operation mode is a second designated operation mode, the transmittance of the UDC area, control the UDC module to configure a second path facing the camera module, and obtain a second image based on light transferred to the camera module through the second path.

20 Claims, 15 Drawing Sheets

(56) References Cited

U.S. PATENT DOCUMENTS

| | | | |
|---|---|---|---|
| 11,380,138 B2* | 7/2022 | Yang | G06V 40/12 |
| 2018/0075277 A1 | 3/2018 | Lee | |
| 2020/0292741 A1 | 9/2020 | Rhee et al. | |
| 2020/0401781 A1 | 12/2020 | Wang | |
| 2021/0084236 A1* | 3/2021 | Han | G06V 40/67 |
| 2021/0150178 A1 | 5/2021 | Wang et al. | |
| 2021/0157362 A1 | 5/2021 | Jo et al. | |
| 2021/0356788 A1 | 11/2021 | Zha | |
| 2022/0201181 A1 | 6/2022 | Yang | |
| 2023/0035206 A1* | 2/2023 | Jin | H04N 23/667 |

FOREIGN PATENT DOCUMENTS

| | | |
|---|---|---|
| CN | 209625236 U | 11/2019 |
| CN | 216161128 U | 4/2022 |
| CN | 114495181 A | 5/2022 |
| EP | 4 224 363 A1 | 8/2023 |
| JP | 2019-164707 A | 9/2019 |
| KR | 10-1596298 B1 | 2/2016 |
| KR | 10-2018-0121329 A | 11/2018 |
| KR | 10-2019-0036194 A | 4/2019 |
| KR | 10-2019-0084397 A | 7/2019 |
| WO | 2020/248467 A1 | 12/2020 |
| WO | 2021/057735 A1 | 4/2021 |

\* cited by examiner

[1301]

[1303]

[1311]

[1313]

APPARATUS AND METHOD FOR PROVIDING FINGERPRINT RECOGNITION AND PHOTOGRAPHING BASED ON UNDER DISPLAY CAMERA IN ELECTRONIC DEVICE

CROSS-REFERENCE TO RELATED APPLICATION(S)

This application is a continuation of International Application No. PCT/KR2022/010539, which was filed on Jul. 19, 2022, and claims priority to Korean Patent Application No. 10-2021-0098546, filed on Jul. 27, 2021, in the Korean Intellectual Property Office, the disclosure of which are incorporated by reference herein their entirety.

BACKGROUND

Technical Field

One or more embodiments of the instant disclosure generally relate to an electronic device having an under display camera (UDC) module and a method and an apparatus for providing a fingerprint recognition mode and a photographing mode by using the UDC module in the electronic device.

Description of Related Art

As digital technologies have developed, there has been widespread use of various kinds of electronic devices such as personal digital assistants (PDAs), smartphones, tablet personal computers, and/or wearable devices. in order to support and enhance the functionality of such electronic devices, the hardware and/or software of the electronic devices have been developed continuously.

Recently, electronic devices in various sizes are commercially available according to functionality and user preferences, and may include large-screen touch displays to provide better user interface experiences. An electronic device may include, as an optical module, at least one camera module disposed under the display in the inner space thereof. The at least one camera module may be disposed so as to photograph an external subject through at least a part of the display. This way, the area of the display may be expanded such that the same can take up all or almost all of the entire area of a cover member (for example, front cover) in order to satisfy the demand for large screens. In line with this display area expansion, the disposition structure of various electronic components disposed through the cover member, for example, at least one camera module, may be changed accordingly. For example, if the camera module is disposed in an area (for example, black matrix (MB) area or inactive area) other than the display area of the cover member, the display area expansion may be limited.

In order solve such a problem, the camera module may be disposed under the display (for example, under display camera (UDC) structure), and the display panel may have a transmittance that enables the camera module to operate by lowering the disposition density of pixels and/or electric wires in the area corresponding to the camera module.

Meanwhile, electronic devices provide various security functions to protect users' privacy information or personal life, and various ways of providing user authentication have been developed. Such security functions may include fingerprint authentication. For example, the fingerprint authentication is easily implemented for an electronic device having a small form factor, and has a relatively high level of accuracy and security, and these advantages are the cause of wide application thereof as authentication means of electronic devices.

An electronic device may recognize a fingerprint by using a fingerprint sensor or fingerprint reader. The fingerprint sensor included in the electronic device is implemented as a small fingerprint sensor which may be smaller than the user's fingerprint in order to reduce the effective surface area. In line with recent trends towards display area expansion, the fingerprint sensor may be implemented as an optical fingerprint sensor and may be disposed under the display.

SUMMARY

The optical fingerprint sensor may have a structure similar to a camera module having the under display camera (UDC) structure. When the electronic device includes a camera module and a fingerprint sensor disposed and implemented in separate areas, respectively, a complicated display structure may be required to efficiently drive each module.

An electronic device according to an embodiment of the disclosure may include a display module, an under display camera (UDC) module including a camera module and a sensor module and formed under the display module, and a processor, wherein the processor may operate so as to detect a trigger related to an operation of the UDC module, identify an operation mode of the UDC module based on the trigger detection, change a transmittance of a UDC area corresponding to a position of the UDC module in a display area of the display module to a first transmittance when the operation mode is a first designated operation mode and control the UDC module to configure a first path facing the sensor module, obtain a first image based on light transferred to the sensor module through the first path after light from the display module is reflected from a first external object on the UDC area, change the transmittance of the UDC area corresponding to the position of the UDC module in the display area of the display module to a second transmittance different from the first transmittance when the operation mode is a second designated operation mode and control the UDC module to configure a second path facing the camera module, and obtain a second image based on light reflected from a second external object outside of the electronic device and transferred to the camera module through the second path.

A method for operating an electronic device according to an embodiment of the disclosure may include detecting a trigger related to an operation of an under display camera (UDC) module, identifying an operation mode of the UDC module based on the trigger detection, changing transmittance of a UDC area corresponding to a position of the UDC module in a display area of a display module to first transmittance when the operation mode is a first designated operation mode and controlling the UDC module to configure a first path facing a sensor module of the UDC module, obtaining a first image based on light transferred to the sensor module through the first path after light from the display module is reflected from a first external object on the UDC area, changing the transmittance of the UDC area corresponding to the position of the UDC module in the display area of the display module to a second transmittance different from the first transmittance when the operation mode is a second designated operation mode and controlling the UDC module to configure a second path facing a camera module of the UDC module, and obtaining a second image based on light reflected from a second external object outside of the electronic device and transferred to the camera module through the second path.

In order to solve the above-mentioned problems, various embodiments of the disclosure may include a computer-readable recording medium in which a program for executing the above method in a processor is recorded.

Additional ranges of the applicability of the disclosure will become clear from the following detailed description. However, since various modifications and changes will be clearly understood by those skilled in the art within the idea and scope of the disclosure, and specific embodiments such as preferred embodiments of the disclosure and the detailed description are to be considered as being given only as examples.

BRIEF DESCRIPTION OF THE DRAWINGS

In connection with the description of the drawings, like or similar reference numerals may be used for like or similar elements. The above and other aspects, features, and advantages of certain embodiments of the present disclosure will be more apparent from the following description taken in conjunction with the accompanying drawings, in which.

DETAILED DESCRIPTION

Certain embodiments provide a UDC module obtained by integrating a sensor module and a camera module in an electronic device, and a method and an apparatus for operating the same.

Certain embodiments provide a method and an apparatus capable of both fingerprint recognition and photographing by using a UDC module obtained by integrating an optical fingerprint sensor and a UDC having a structure similar thereto in an electronic device.

Certain embodiments provide a method and an apparatus capable of supporting a fingerprint recognition mode and a photographing mode (for example, normal photographing mode or face recognition mode) by using a UDC module in an electronic device having a UDC module.

Certain embodiments provide a method and an apparatus where a prism of a UDC module is rotated to switch an optical path in order to acquire images (for example, acquiring captured images or fingerprint images), and color distribution (for example, skin color information) is identified in the fingerprint recognition mode, thereby determining whether the fingerprint image is a forgery.

According to an electronic device and a method for operating the same according to certain embodiments, when the electronic device has an under display camera (UDC) module, the UDC module may be used to implement both a fingerprint recognition mode and a photographing mode (for example, normal photographing mode or face recognition mode). According to an embodiment, the electronic device may be provided such that fingerprint recognition and photographing are both available by using the UDC module, which integrates an optical fingerprint sensor and a UDC having a structure similar thereto. According to an embodiment, the electronic device may combine a sensor module for fingerprint recognition and a camera module for photographing into a UDC structure, thereby simplifying display module design and improving fingerprint recognition performance and forgery security.

According to an embodiment, an electronic device may change the light transmittance in an area corresponding to a UDC module under a display module, based on a designated operating mode, thereby acquiring an optical fingerprint image having a higher quality corresponding to the designated operating mode, and improving fingerprint recognition performance. According to an embodiment, in the electronic device, the mounting space for the UDC module may be secured and display module design may be simplified due to the integrated design of the camera module and the sensor module (for example, implementing a single UDC module). According to an embodiment, the electronic device may acquire both fingerprint images and captured images (or color image) through the UDC module, and may improve security by determining counterfeit fingerprints by using a color distribution (for example, skin color information) based on the captured image.

Figure 1:
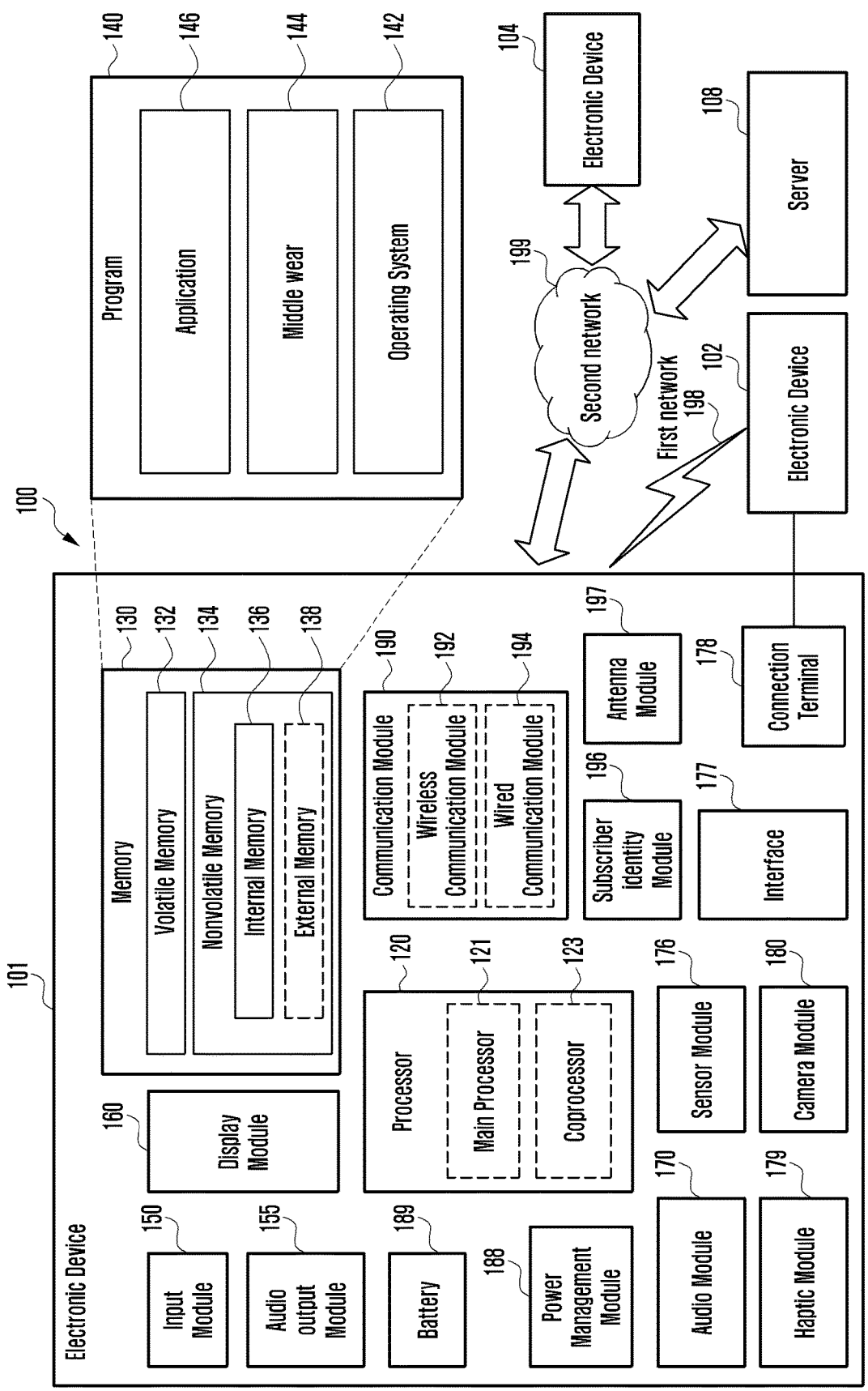
FIG. 1 is a block diagram illustrating an example electronic device in a network environment according to an embodiment.

FIG. 1 is a block diagram illustrating an example electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
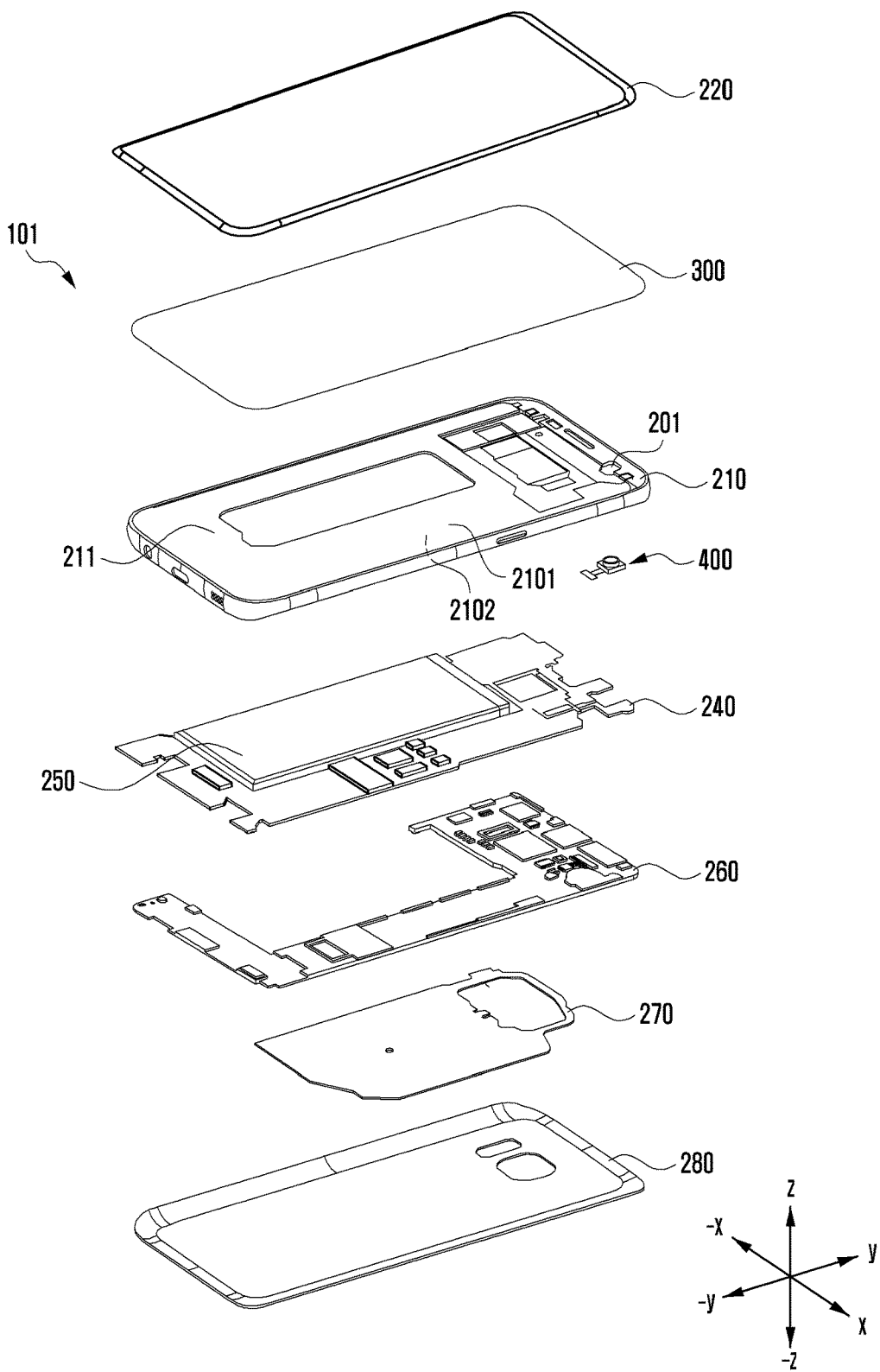
FIG. 2 is an exploded perspective view of an electronic device according to an embodiment.

FIG. 2 is an exploded perspective view of an electronic device according to an embodiment.

The electronic device 101 In FIG. 2 may be at least partially similar to the electronic device 101 in FIG. 1 or may include another embodiment of the electronic device 101.

Referring to FIG. 2, the electronic device 101 may include a lateral member 210 (for example, lateral bezel structure), a first support member 211 (for example, bracket or a support structure), a front plate 220 (for example, front cover), a display 300, a printed circuit board 240, a battery 250, a second support member 260 (for example, rear case), an antenna 270, and a rear plate 280 (for example, rear cover). In an embodiment, the electronic device 101 may omit at least one of the components (for example, the first support member 211 or the second support member 260) or additionally include other component(s). At least one of the components of the electronic device 101 may be the same as or similar to at least one of the components of the electronic device 101 as described above in the description with reference to FIG. 1, and thus duplicative description thereof will be omitted.

The first support member 211 may be disposed in the electronic device 101 to be connected to the lateral structure 210 or integrated with the lateral structure 210. The first support member 211 may be made of, for example, a metal material and/or a non-metal (for example, polymer) material. The first support member 211 may have the display 300 coupled to one surface thereof and the printed circuit board 240 coupled to the other surface thereof. A processor (for example, the processor 120 in FIG. 1), a memory (for example, the memory 130 in FIG. 1), and/or an interface (for example, the interface 177 in FIG. 1) may be disposed on the printed circuit board 240. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

The battery 250 (for example, the battery 189 in FIG. 1) is a device for supplying power to at least one component of the electronic device 101, and may include, for example, a non-rechargeable primary battery, or a rechargeable secondary battery, or a fuel cell. At least a part of the battery 250 may be disposed, for example, to be co-planar with the printed circuit board 240. The battery 250 may be integrally disposed inside the electronic device 101. In another example, the battery 250 may be disposed to be user-attachable to/detachable from the electronic device 101.

The antenna 270 (for example, the antenna module 197 in FIG. 1) may be interposed between the rear plate 280 and the battery 250. The antenna 270 may include, for example, a near field communication (NFC) antenna, a wireless charge antenna, and/or a magnetic secure transmission (MST) antenna. The antenna 270 may transmit and receive signals required for charging or perform near field communication with an external device, for example. In another embodiment, the antenna structure may be implemented using a part or a combination of the lateral member 210 and/or the first support member 211.

According to an embodiment, the first support member 211 of the lateral member 210 may include a first surface 2101 facing the front plate 220 and a second surface 2102 facing an opposite direction (for example, rear plate direction) of the first surface 2101. According to an embodiment, an under display camera module 400 (for example, the camera module 180 and the sensor module 176 (for example, fingerprint module) in FIG. 1) may be disposed between the first support member 211 and the rear plate 280. According to an embodiment, the UDC module 400 may be disposed to protrude toward or be visually exposed through the front plate 220 via a through-hole 201 connecting a first surface 2101 of the first support member 211 to a second surface 2102. According to an embodiment, as the UDC module 400 protrudes through the through-hole 201, it may be used to detect an external environment of the device when it is disposed in a position corresponding to the display 300. For another example, when the UDC module 400 is disposed between the display 300 and the first support member 211, the through-hole 201 may not be necessary.

Figure 3:
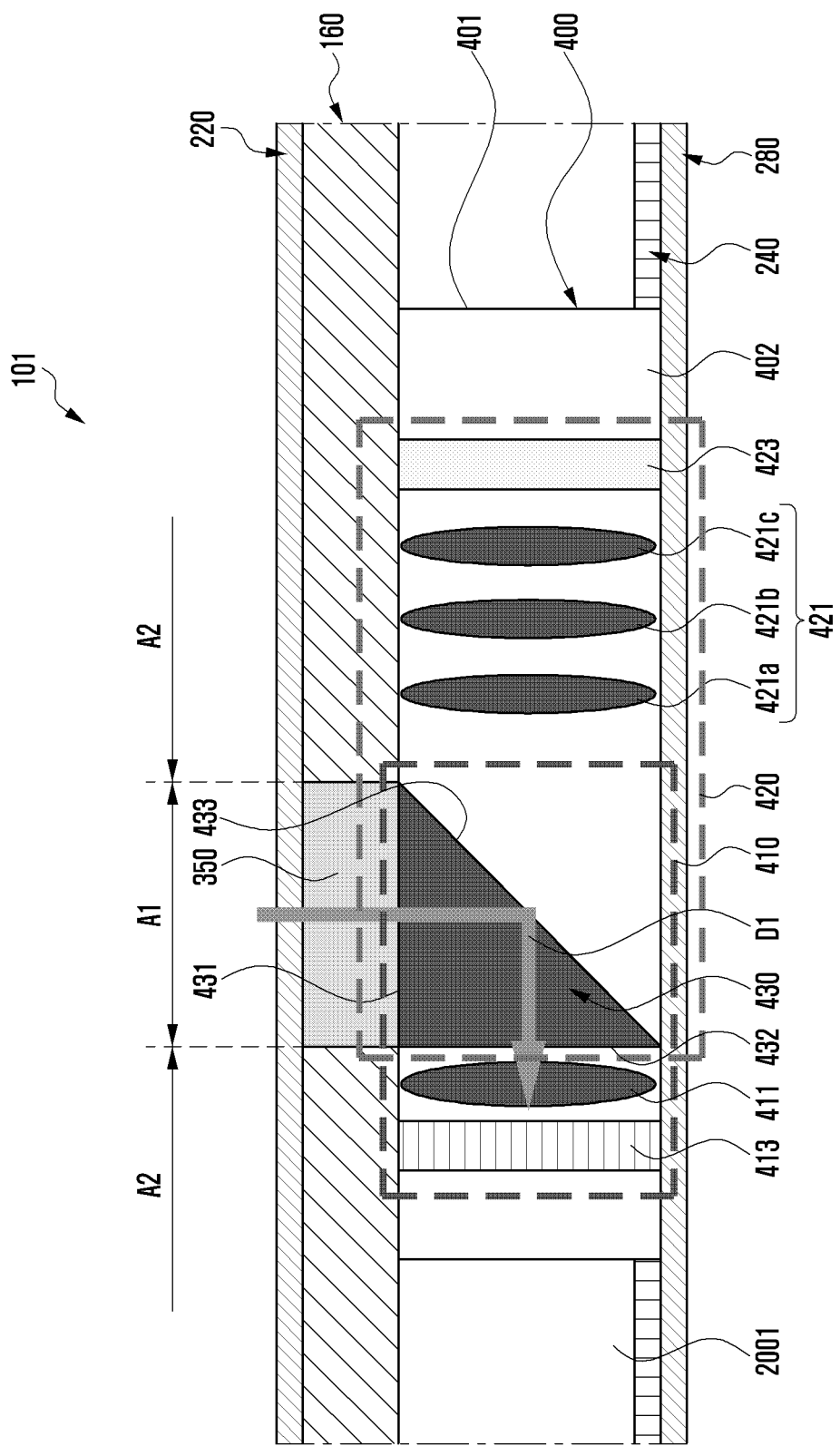
FIG. 3 is a view illustrating a partial section of an UDC module and an operation example of an electronic device according to an embodiment.
Figure 4:
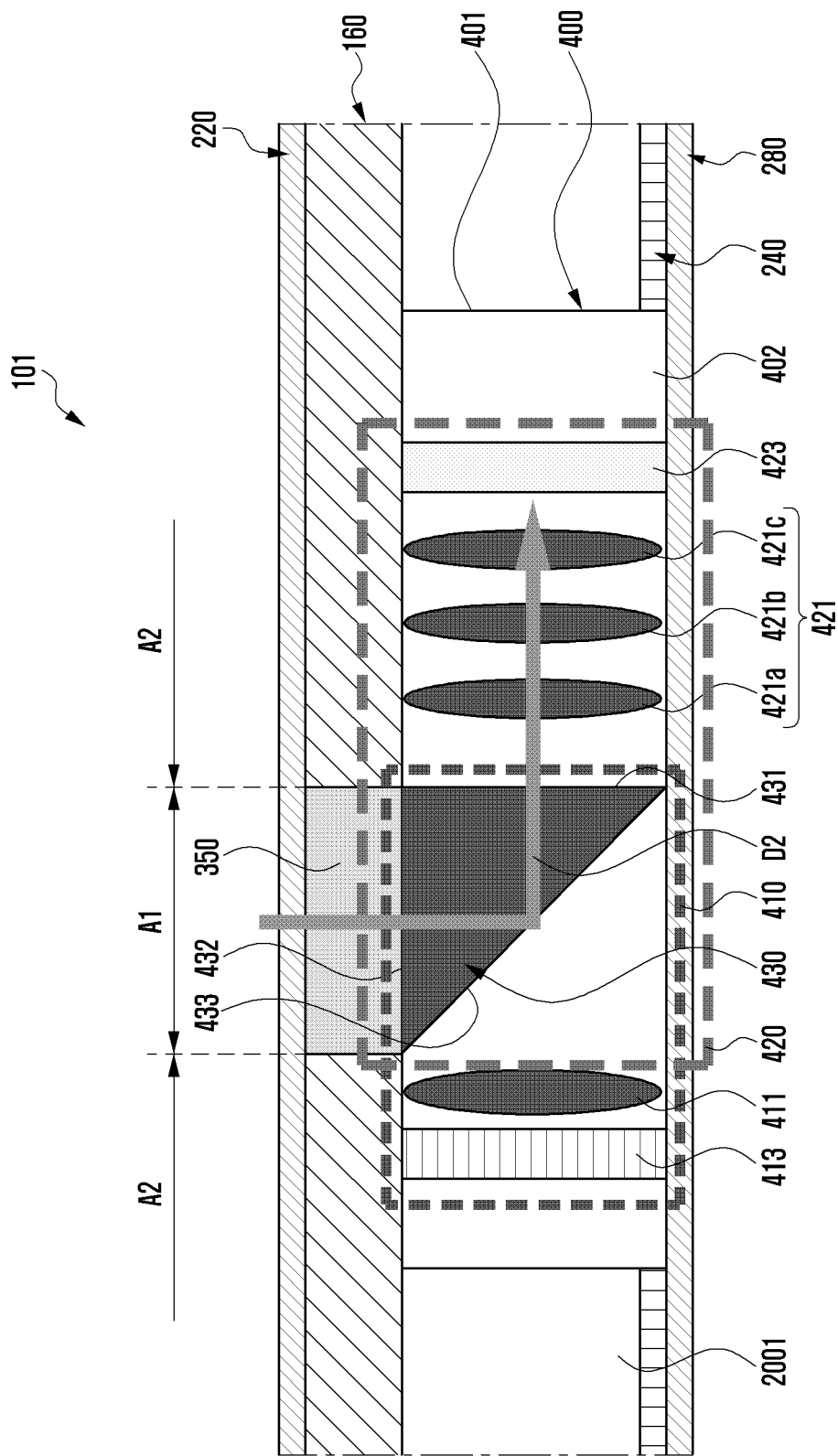
FIG. 4 is a view illustrating a partial section of an UDC module and an operation example of an electronic device according to an embodiment.

FIG. 3 and FIG. 4 are views illustrating a partial section of an UDC module and an operation example of an electronic device according to certain embodiments.

Referring to FIG. 3 and FIG. 4, the electronic device 101 may include a front cover 220 (for example, cover member, front plate, front window, or first plate) facing a first direction (for example, z-axis direction), a rear cover 280 (for example, rear cover member, rear plate, rear window, or second plate) facing a direction opposite to the front cover 220, and a lateral member (for example, the lateral member 210 in FIG. 2) surrounding an inner space 2001 between the front cover 220 and the rear cover 280.

According to an embodiment, FIG. 3 and FIG. 4 may show a cross-sectional view of one side including the display module 160 and the under display camera (UDC) module 400 of the electronic device 101. As shown in the drawings, the electronic device 101 may include the display module 160 and the UDC module 400 under the display module 160 (for example, the display 300 in FIG. 2). For example, the UDC module 400 may be disposed in the inner space 2001 of the electronic device 101 and may be disposed under the display module 160.

According to an embodiment, the UDC module 400 may be secured by being structural coupled to the printed circuit board 240 and the display 160. According to an embodiment, the UDC module 400 may be disposed under (for example, under a rear surface) the display module 160, supported by the printed circuit board 240, and electrically connected to a solid-state component (for example, the processor 120, the memory 130, and/or the interface 177) of the printed circuit board 240. According to an embodiment, the corresponding area (for example, the UDC area 350 or transmission area) of the display 160 to which the UDC module 400 is disposed may be an area having a relatively lower pixel density than other areas of the display module 160.

According to an embodiment, the UDC module 400 may include a sensor module 410 (for example, the fingerprint sensor module as the sensor module 176 in FIG. 1) and a camera module 420 (for example, the camera module 180 in FIG. 1).

According to an embodiment, the sensor module 410 and the camera module 420 of the UDC module 400 may be disposed in the inner space 402 of the housing 401 and disposed to face each other at least partially in the horizontal direction (for example, y-axis direction or x-axis direction). According to an embodiment, the sensor module 410 of the UDC module 400 may include a prism 430 rotatably disposed so that one surface thereof at least partially faces the direction of the display module 160 in the inner space 402 of the housing 401 and the other surface thereof at least partially faces the sensor module 410 or the camera module 420, at least one lens 411, and/or at least one first sensor 413 (for example, the fingerprint sensor) disposed to obtain at least a portion of light having passed through the prism 430 and the lens 411 in the inner space 402 of the housing 401.

According to an embodiment, the camera module 420 of the UDC module 400 may include a prism 430 rotatably disposed so that one surface thereof at least partially faces a direction of the display module 160 in the inner space 402 of the housing 401 and the other surface thereof at least partially faces the sensor module 410 or the camera module 420, multiple lenses (421: 421*a*, 421*b*, and 421*c*) aligned at predetermined intervals, and at least one second sensor 423 (for example, an image sensor) disposed to obtain at least a portion of light having passed through the prism 430 and the multiple lenses 421 in the inner space 402 of the housing 401.

According to an embodiment, the prism 430 may be a transparent optical element capable of dividing light incident through the UDC area 350 (or transmission area) of the display module 160 according to wavelength of light, or change the progress direction of light via reflection or total internal reflection. According to an embodiment, the prism 430 may be commonly included (or shared) in the sensor module 410 and the camera module 420 in the UDC module 400, and may change the progress direction of light based on the operation mode of the UDC module 400.

According to an embodiment, in a first designated operation mode (for example, a mode in which the sensor module 410 operates, that is, the fingerprint recognition mode), the prism 430 may be rotated so that a first surface 431 thereof faces a direction of the display module 160 and a second surface 432 thereof faces toward the sensor module 410 so as to set the light path to be toward the sensor module 410. According to an embodiment, in the first designated operation mode of the UDC module 400, the prism 430 may set the progress direction of light (or light path) having been incident through the first surface 431 to be directed toward a direction (for example, first path D1) toward the sensor module 410 through reflection (or refraction) by a third surface 433 (for example, a reflection surface). For example, the prism 430 may set the first path D1 in which the light having been incident through the first surface 431 is reflected by the third surface 433 to pass through the second surface 432 so as to transferred to the first sensor 413.

According to an embodiment, in a second designated operation mode (for example, a mode in which the camera module 420 operates, that is, the photographing mode or face recognition mode), the prism 430 may be rotated so that the second surface 432 thereof faces the direction of the display module 160 and the first surface 431 thereof faces toward the camera module 420 so as to set the light path to be toward the camera module 420. According to an embodiment, in the second designated operation mode of the UDC module 400, the prism 430 may set the progress direction of light (or light path) having been incident through the second surface 432 to be directed toward a direction (for example, second path D2) toward the camera module 420 through reflection by the third surface 433 (for example, a reflection surface). For example, the prism 430 may set the first path D2 in which the light having been incident through the second surface 432 is reflected by the third surface 433 to pass through the first surface 431 so as to transferred to the second sensor 423.

According to an embodiment, the UDC module 400 (for example, the camera module) may rotate the prism 430 through a predetermined driving unit (not shown) of the housing 401. According to an embodiment, the UDC module 400 may include a separate driving unit disposed therein to change (for example, rotate) the direction of the prism 430. Although the example of FIG. 3 and FIG. 4 shows a structure in which the prism 430 is in close contact with the display module 160 for ease of description, in another embodiment, the prism 430 may be designed to be implemented being rotatable at another location in the inner space 402 of the housing 401.

According to an embodiment, the sensor module 410 of the UDC module 400 may include an optical fingerprint sensor capable of detecting fingerprints of fingers touching the outer surface of the front cover 220 through the UDC area 350 (or transmission area) formed at least partially on the display module 160. For example, the sensor module 410 may include an optical fingerprint sensor configured to obtain a reflected fingerprint image (or video) by a designated light source (for example, visible light or infrared light).

According to an embodiment, as the designated light source, for example, the display module 160 or an IR LED light source of an infrared ray (IR) sensor separately configurable under the display module 160 may be used. For example, the IR sensor may be disposed adjacent (or in a position within a designated distance (for example, about 10 mm)) to the UDC module 400. The IR sensor radiates IR light and the sensor module 410 may be implemented to obtain fingerprint images reflected by the IR LED light source.

According to an embodiment, the camera module 420 of the UDC module 400 may obtain of images of an external object (for example, a subject) by capturing light incident from the outside of the front cover 220 through the UDC area formed at least partially on the display module 160.

According to an embodiment, in a top view of the cover 220, the display module 160 may include the UDC area 350 (or a transmission area) configured to improve optical transmission of the UDC module 400. In an embodiment, the UDC area 350 is a portion of a display area of the display module 160 and may be configured to have a predetermined transmission or more. For example, the UDC area 350 may be configured to have transmission in the range of about 5% to about 20%.

According to an embodiment, an area (for example, the UDC area 350) of the display module 160 corresponding to the UDC module 400 may be processed to be at least partially transparent or may be deprived of the polarization properties thereof. According to an embodiment, the display module 160 (for example, the display 300 in FIG. 2) may include an organic light emitting diode (OLED) display, an active matrix organic light emitting diode (AMOLED) display, or a liquid crystal display (LCD).

According to an embodiment, the UDC area 350 of the display module 160 may have different sizes depending on the shape of the UDC module 400.

According to an embodiment, in a top view of the display module 160, the display module 160 may include a first area A1 overlapping an effective aperture (for example, the shape and size of the prism 430) of the UDC module 400 and a second area A2 surrounding the first area A1. According to an embodiment, the first area A1 (for example the UDC area 350) may be configured to have light transmittance required by the UDC module 400 by adjusting a pixel density and/or wire density.

According to an embodiment, the second area A2 may include a general active area of the display module 160. According to an embodiment, the second area A2 may be an area in which light transmittance for the UDC module 400 is not considered. According to an embodiment, the display module 160 may include first multiple pixels arranged to have a first arrangement density in the first area A1 and second multiple pixels having a second arrangement density larger than the first arrangement density in the second area A2. In an embodiment, the wire density of the first area A1 may be configured to be lower than that of the second area A2 to help improving transmittance.

According to an embodiment, the display module 160 may be implemented in a shape in which multiple pixels are arranged based on a configured interval and position. The display module 160 may be operated in a state in which at least one pixel is turned on or turned off. According to an embodiment, the display module 160 may control a pixel corresponding to a partial area (for example, as the UDC area (or transmittance area), the area corresponding to the position in which the UDC module 400 is disposed). For example, when a trigger related to an operation of the UDC module 400 is detected, in a corresponding operation mode (for example, a first designated operation mode or a second designated operation mode), the processor 120 may control on/off (for example, pixel on or pixel off) of the pixel corresponding to the partial area (for example, the UDC area 350) of the display module 160 corresponding to the position in which the UDC module 400 is disposed.

According to an embodiment, the processor 120 may change (or control) the transmittance of the UDC area 350 based on the pixel on/off control of the UDC area 350 corresponding to the position in which the UDC module 400 is disposed in the display area of the display module 160 in the first designated operation mode. For example, the processor 120 may change a first transmittance based on on-control of at least one pixel corresponding to the UDC area 350, or change a second transmittance based on off-control of at least one pixel.

According to an embodiment, the transmittance change (for example, first transmittance change or second transmittance change) may change the display area to be visually transparent or opaque. For example, the first transmittance change based on the pixel on control of the UDC area 350 may cause the UDC area 350 to be visually opaque. In another example, the second transmittance change based on the pixel off control of the UDC area 350 may cause the UDC area 350 to be visually transparent.

According to an embodiment, the first transmittance and the second transmittance may have different transmittivity (or transparency) (for example, various degrees of visual transparency). For example, the first transmittance may have transmittivity lower than that of the second transmittance.

According to an embodiment, the processor 120 may change to the first transmittance by means of the pixel on control of the UDC area 350 based on the first designated operation mode (for example, the fingerprint recognition mode). According to an embodiment, the processor 120 may change to the second transmittance by means of the pixel off control of the UDC area 350 based on the second designated operation mode (for example, the photographing mode of face recognition mode). According to an embodiment, the first transmittance according to the first designated operation mode may be controlled to be lower than the second transmittance according to the second designated operation.

According to an embodiment, the processor 120 may obtain a fingerprint image reflected from an external object (for example, a user finger) by light emitted by the UDC area 350 by processing the UDC area 350 to be relatively visually opaque based on the pixel on control (for example, the first transmittance change) of the UDC area 350 in the first designated operation mode (for example, the fingerprint recognition mode). For example, in the first designated mode, the processor 120 may obtain a fingerprint image in the first transmittance based on the pixel on control of the UDC area 350.

According to an embodiment, the processor 120 may obtain a clearer and more accurate photograph image (for example, a high-definition image) by processing the UDC area 350 to be relatively visually transparent based on the pixel off control (for example, the second transmittance change) of the UDC area 350 in the second designated operation mode (for example, the photographing mode or face recognition mode). For example, in the second designated mode, the processor 120 may obtain a photograph image in the second transmittance based on the pixel off control of the UDC area 350.

Figure 5:
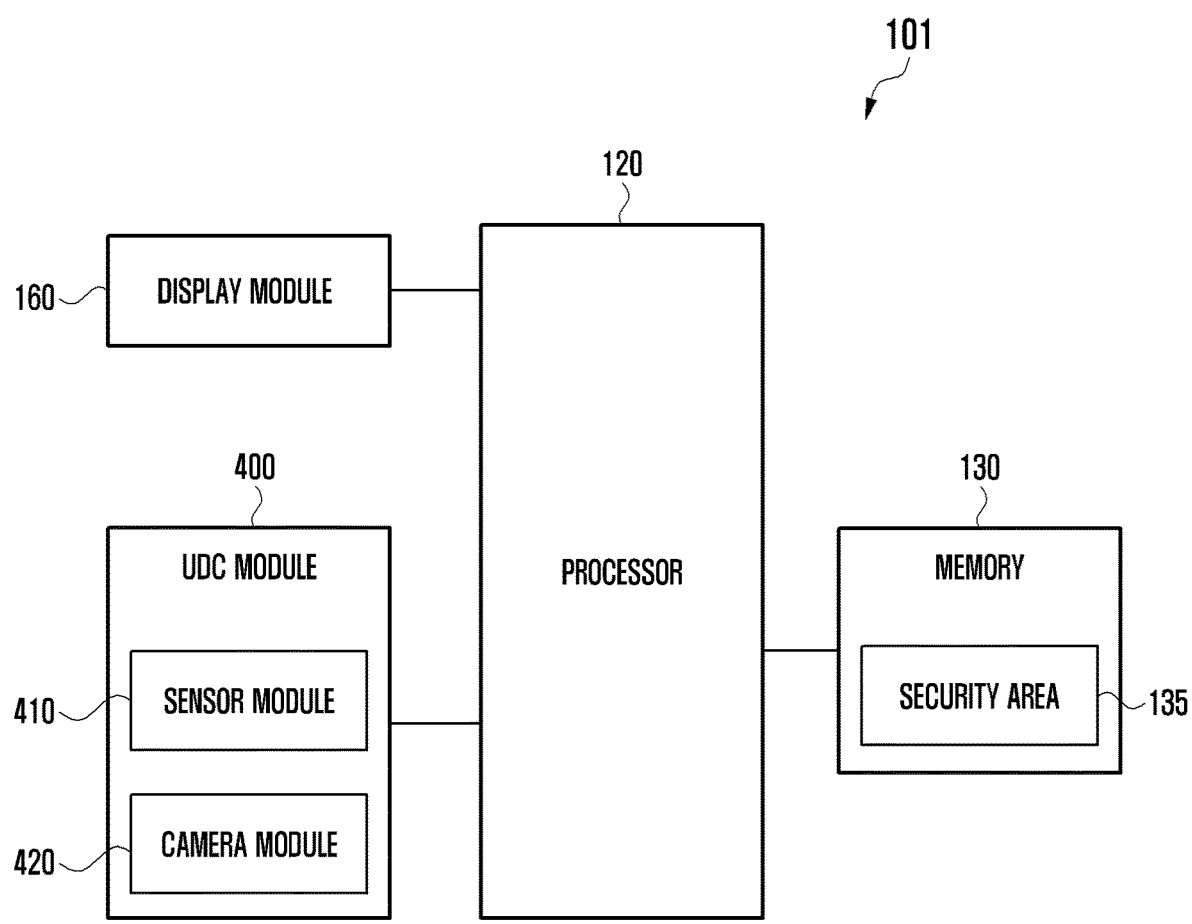
FIG. 5 is a block diagram of an electronic device according to an embodiment.

FIG. 5 is a block diagram of an electronic device according to an embodiment.

In the disclosure, the electronic device 101 according to the embodiment may be a smart phone, a tablet PC, and/or a laptop computer. According to an embodiment, the electronic device 101 may be a device having various shapes, such as bar, foldable, slidable, or rollable depending on how the device is implemented. In an embodiment, the electronic device 101 in FIG. 5 may be identical or similar to the electronic device 101 described with reference to FIG. 1 in terms of components, or may include other embodiments.

Referring to FIG. 5, the electronic device 101 according to an embodiment may include a display module 160, a UDC module 400, a memory 130, and/or a processor 120.

The display module 160 according to an embodiment may include a configuration corresponding to the display module 160 described with reference to FIG. 1. According to an embodiment, the display module 160 may visually provide various information to the outside (for example, a user) of the electronic device 101. According to an embodiment, the display module 160 may include a touch detection circuit (or touch sensor) (not shown), a pressure sensor for detecting strength of touches, and/or a touch panel (for example, a digitizer) for detecting a magnetic-field-type stylus pen. According to an embodiment, the display module 160 may detect a touch input and/or a hovering input (or proximity input) by measuring change of a signal (for example, voltage, light quantity, resistance, electromagnetic signal, and/or charge quantity) for a designated position of the display module 160 based on the touch detection circuit, pressure sensor, and/or touch panel.

According to an embodiment, under the control of the processor 120, the display module 160 may provide transmittance change (for example, an opacity process by the pixel on control or a transparency process by the pixel off control) related to at least one designated area (for example, the UDC area 350 in FIG. 3 and FIG. 4), and may visually provide operation information (for example, color information for guiding the user for a position and/or operation mode of the UDC module 400) related to an operation (for example, fingerprint recognition operation or photographing operation) of the electronic device 101 based on the designated area (for example, the UDC area 350 in FIG. 3 and FIG. 4) and/or a peripheral area of the designated area.

The UDC module 400 according to an embodiment may include a configuration corresponding to the UDC module 400 described with reference to FIG. 3 and FIG. 4.

According to an embodiment, the UDC module 400 may include a sensor module 410 and a camera module 420.

The sensor module 410 according to an embodiment may be an optical fingerprint sensor. According to an embodiment, the electronic device 101 may allow a fingerprint image to be registered or authenticated based on sensing data using the sensor module 410. According to an embodiment, the sensor module 410 may include a prism (for example, the prism 430 in FIG. 3 and FIG. 4) rotatably disposed so that one surface thereof at least partially faces the direction of the display module 160 and the other surface thereof at least partially faces the sensor module 410 or the camera module 420, at least one lens (for example, the lens 411 in FIG. 3 and FIG. 4), and the fingerprint sensor (for example, the first sensor 413 in FIG. 3 and FIG. 4) configured to obtain a first image (for example, fingerprint image) by obtaining at least a portion of light having passed through the prism and the lens.

The camera module 420 according to an embodiment may include a configuration corresponding to the camera module 180 described with reference to FIG. 1. According to an embodiment, the camera module 420 may capture still image or video. According to an embodiment, the camera module 420 may include a prism (for example, the prism 430 in FIG. 3 and FIG. 4) rotatably disposed so that one surface thereof at least partially faces the direction of the display module 160 and the other surface thereof at least partially faces the sensor module 410 or the camera module 420, one or more lenses (for example, the lenses 421 in FIG. 3 and FIG. 4), and an image sensor (for example, the second sensor 423 in FIG. 3 and FIG. 4) configured to obtain a second image (for example, a photograph image (for example, a subject or face image) by obtaining at least a portion of light having passed through the prism and the lens.

The memory 130 according to an embodiment may include a configuration corresponding to the memory 130 described with reference to FIG. 1. According to an embodiment, the memory 130 may store various data used by the electronic device 101. The data may include, for example, an application (for example the program 140 in FIG. 1) and input data or output data related to various commands.

According to an embodiment, the memory 130 may include an application related to obtaining and processing images by controlling the light path of the UDC module 400 based on the corresponding operation mode which may be performed by the processor 120. For example, the application may include an application (for example, fingerprint recognition application) capable of fingerprint recognizing and user authenticating. According to an embodiment, the application may be stored as software (for example, the program 140 in FIG. 1) in the memory 130 and operated by the processor 120.

According to an embodiment, the memory 130 may store data related to operation of various functions that may be performed by the processor 120. For example, the memory 130 may include one or more instructions related to controlling the light path of the UDC module 400 based on a corresponding operation mode and processing image obtained through the light path when the electronic device 101 performs a function. For example, the memory 130 may store one or more instructions that may be performed by the processor 120.

According to an embodiment, the memory 130 may include a secure area 135 (for example, a trust zone). In an embodiment, the secure area 135 may include user information and/or authentication information (for example, fingerprint information) related to authentication of the electronic device 101. According to an embodiment, the electronic device 101 may separately configure the secure area 135 of the memory 130 for reinforcing security of authentication, and the secure area 135 may be implemented in an embedded secure chip or embedded secure area (for example, an embedded secure element (eSE)).

The processor 120 according to an embodiment may control the light path of the UDC module 400 based on a corresponding operation mode and process an image obtained through the light path when the electronic device 101 performs a function.

According to an embodiment, the processor 120 may detect a trigger related to an operation of the UDC module 400, identify an operation mode of the UDC module 400 based on the trigger detection, control the light path of the UDC module 400 based on the identified operation mode, and configure (for example, change) transmittance (for example, the first transmittance or the second transmittance) of the UDC area corresponding to the position of the UDC module 400 in the display area of the display module 160.

According to an embodiment, the processor 120 may change the transmittance of the UDC area to the first transmittance (for example, visual opacity process), based on the on-control of a pixel corresponding to the UDC area (for transmittance area) corresponding to a position of the UDC module 400 in a display area of the display module 160 when the operation mode is the first designated operation mode. According to an embodiment, when the operation mode is the first designated mode, the processor 120 may control (for example, rotation control of the prism 430) the UDC module 400 so that the light path of the UDC module 400 for obtaining an image is the first path facing the sensor module 410. According to an embodiment, the processor 120 may obtain a first image (for example, a fingerprint image) based on the light transferred to the sensor module 410 through the first path in the UDC area and incident through the UDC area of the display module 160 after light from a light source (for example, the light source of the UDC area) of the display module 160 is reflected from a first external object (for example, a finger). According to an embodiment, the processor 120 may perform processing (for example, processing an authentication operation and/or counterfeit determination operation) with respect to the first image.

In an embodiment, the first designated operation mode may be a fingerprint recognition mode. According to an embodiment, in the fingerprint recognition mode, the processor 120 may activate the UDC module 400 in the fingerprint recognition mode (for example, light path control through rotation control of the prism 430), and perform authentication based on the image (for example, a fingerprint image) obtained through the first path.

According to an embodiment, the processor 120 may change the transmittance of the UDC area to the second transmittance different from the first transmittance (for example, visual transparency process), based on the off control of a pixel corresponding to the UDC area (for transmittance area) corresponding to a position of the UDC module 400 in a display area of the display module 160 when the operation mode is the second designated operation mode. According to an embodiment, when the operation mode is the second designated mode, the processor 120 may control (for example, rotation control of the prism 430) the UDC module 400 so that the light path of the UDC module 400 for obtaining an image is the second path facing the camera module 420. According to an embodiment, the processor 120 may obtain a second image (for example, a photograph image) based on the light that is reflected from a second external object (for example, a subject of user face) outside of the electronic device 101, incident through the UDC area of the display module 160, and transferred to the camera module 420 through the second path. According to an embodiment, the processor 120 may perform processing (for example, processing a preview display operation, storing operation, and/or counterfeit determination operation) with respect to the second image.

In an embodiment, the second designated mode may include a photographing mode (for example, general photographing mode and/or face recognition mode). According to an embodiment, in the photographing mode, the processor 120 may activate the UDC module 400 in the photographing mode (for example, light path control through rotation control of the prism 430), and display (for example, display a preview image) the obtained image (for example, photograph image) through the second path through the display module 160, or store the image in the memory 130.

The processor 120 according to an embodiment may control various operations related to other functions of the electronic device 101 in addition to the function described above. For example, when a designated application is operated, the processor 120 may control the operation of the application and screen display. For another example, the processor 120 may transmit or receive data through communication with an external device, and control the transmitted or received data to be displayed through the display module 160. For example, the processor 120 may receive an input signal corresponding to various touch events supported by a touch-based or proximity-based input interface or an event input, and control a function operation according thereto.

According to an embodiment, the electronic device 101 is not limited to components shown in FIG. 2 and at least one component may be omitted therefrom or added thereto. According to certain embodiments, the electronic device 101 may include a voice recognition module (not shown). For example, the voice recognition module (not shown) may indicate an embedded automatic speech recognition (eASR) module and/or and embedded natural language understanding (eNLU).

Certain embodiments described in the disclosure may be implemented in a computer or non-transitory computer-readable recording medium as a device similar thereto by using software, hardware, of a combination thereof. In certain embodiments, the non-transitory computer-readable recording medium may include a non-transitory computer-readable recording medium recording a program for performing operations of controlling a light path of the UDC module 400 based on a corresponding operation mode and processing an image obtained through the light path when the electronic device 101 performs a function.

The electronic device 101 according to an embodiment of the disclosure may include a display module 160, an under display camera (UDC) module 400 including a camera module 420 and a sensor module 410, and formed under the display module 160, and a processor 120, wherein the processor 120 is operated to detect a trigger related to an operation of the UDC module 400, identify an operation mode of the UDC module 400 based on the trigger detection, change a transmittance of a UDC area 350 corresponding to a position of the UDC module 400 in a display area of the display module 160 to a first transmittance when the operation mode is a first designated operation mode and control the UDC module 400 to configure a first path D1 facing the sensor module 410, obtain a first image based on light transferred to the sensor module 410 through the first path after light from the display module 160 is reflected from a first external object on the UDC area 350, change the transmittance of the UDC area 350 corresponding to the position of the UDC module 400 in the display area of the display module 160 to a second transmittance different from the first transmittance when the operation mode is a second designated operation mode and control the UDC module 400 to configure a second path D2 facing the camera module 420, and obtain a second image based on light reflected from a second external object outside of the electronic device 101 and transferred to the camera module 420 through the second path.

According to an embodiment, the sensor module 410 and the camera module 420 of the UDC module 400 may be configured to be disposed in the inner space 402 of the housing 401 and disposed to face each other at least partially in the horizontal direction.

According to an embodiment, the UDC module may include a prism 430 rotatably disposed so that one surface thereof faces a direction of the display module 160 in the inner space 402 of the housing 401 and the other surface thereof faces the sensor module 410 or the camera module 420. The sensor module 410 of the UDC module 400 may include at least one first lens 411, and at least one first sensor 413 disposed to obtain at least a portion of light having passed through the prism 430 and the at least one first lens 411 in the inner space 402 of the housing 401.

According to an embodiment, the camera module 420 of the UDC module 400 may include multiple second lenses 421 aligned at predetermined intervals, and at least one second sensor 423 disposed to obtain at least a portion of light having passed through the prism 430 and the multiple second lenses 421 in the inner space 402 of the housing 401.

According to an embodiment, the prism 430 may be shared by the sensor module 410 and the camera module 420, and operated to change a progress direction of the light having passed through the prism based on whether the operation mode is the first designated operation mode or the second designated operation mode.

According to an embodiment, the at least one first sensor 413 may include an optical fingerprint sensor configured to obtain a fingerprint image of the first external object coming in contact through the UDC area.

According to an embodiment, the processor 120 may be configured to control the display module 160 to display an indicating object in a peripheral area of the UDC area, and the indicating object may be configured to guide a user to the position of the UDC module 400 and/or to indicate the operation mode and is displayed while the UDC module 400 is activated.

According to an embodiment, the processor 120 may operate to control the display module 160 to turn on pixels in the UDC area and/or the peripheral area in a designated color and designated brightness.

According to an embodiment, the processor 120 may operate to sequentially change the designated brightness of the UDC area a designated number of times and obtain a designated number of fingerprint images corresponding to the designated number of times.

According to an embodiment, the processor 120 may operate to perform authentication based on a first fingerprint obtained based on default brightness, and sequentially perform authentication based on additional fingerprint images obtained based on brightnesses other than the default brightness when the authentication based on the first fingerprint fails.

According to an embodiment, the processor 120 may operate to process the UDC area to be visually opaque based on the pixel on control of the UDC area in the first designated operation mode so as to change the transmittance of the UDC area to the first transmittance, and to process the UDC area to be visually transparent by the pixel off control of the UDC area in the second designated operation mode so as to change the transmittance of the UDC area to the second transmittance.

According to an embodiment, when operating in the first designated operation mode, the processor 120 may rotate the prism 430 of the UDC module 400 to control light having passed through the UDC area of the display module, the prism 430, and the at least one first lens 411 to be incident to the at least one first sensor 413.

According to an embodiment, when operating in the second designated operation mode, the processor 120 may rotate the prism 430 of the UDC module 400 to control light having passed through the UDC area of the display module 160, the prism 430, and the multiple second lens 421 to be incident to the at least one second sensor 423.

According to an embodiment, in the first designated operation mode, the processor 120 may rotate a first surface of the prism 430 to face the direction of the display module 160 and a second surface of the prism 430 to face the at least one first sensor 413 to configure a first path in which light having been incident through the first surface is reflected from a third surface of the prism 430 to pass through the second surface so as to be transferred to the first sensor 413 so that a light path is configured to the at least one first sensor 413.

According to an embodiment, in the second designated operation mode, the processor 120 may rotate the second surface to face the direction of the display module 160 and the first surface to face the at least one second sensor 423 and configure a second path in which light having been incident through the second surface is reflected from the third surface to pass through the first surface so as to be transferred to the second sensor 423 so that a light path configured to the at least one second sensor 423.

According to an embodiment, in response to the determination of the designated operation mode, the processor 120 may operate to identify a direction in which the prism 430 is currently facing in the UDC module 400, and when the direction in which the prism 430 is currently facing does not correspond to the designated operation mode, to control the rotation of the prism 430 so as to change the direction of the prism 430.

According to an embodiment, the processor 120 may operate to identify the operation mode based on whether an operation of the UDC module 400 is for authentication or photographing purpose.

According to an embodiment, the processor 120 may operate to determine whether the first image is a counterfeit image, perform authentication based on the first image when the first image is determined to be a normal image, and perform a designated operation related to security when the first image is determined to be a forgery image.

According to an embodiment, in the first designated operation mode, the processor 120 may operate to control the rotation of the prism 430 to change the currently configured first path of the UDC module 400 to the second path, obtain a photograph image using light transferred through the second path of the UDC module 400 by using the camera module 420, and determine whether the photograph image is a forgery, based on the photograph image.

Hereinafter, operation methods of the electronic device 101 according to certain embodiments will be described in detail. According to certain embodiments, operations performed in the electronic device 101 to be described below may be performed by the processor 120 including at least one processing circuitry of the electronic device 101. According to certain embodiments, the operations performed in the electronic device 101 may be stored in the memory 130 and performed, when executed, by instructions configured to operate the processor 120.

Figure 6:
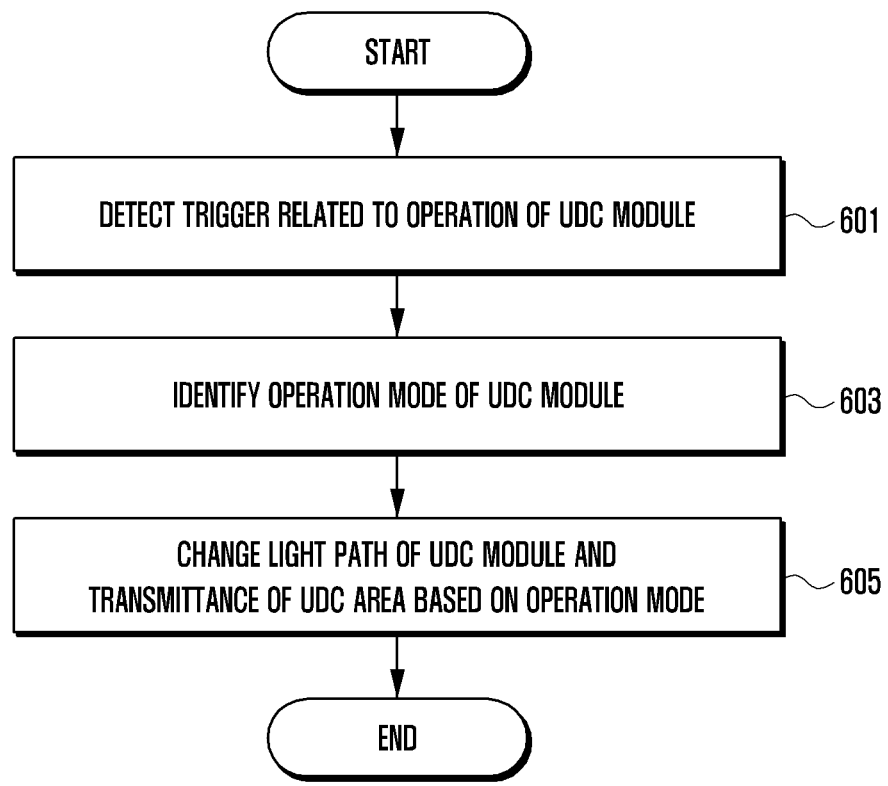
FIG. 6 is a flowchart illustrating an operation method of an electronic device according to an embodiment.

FIG. 6 is a flowchart illustrating an operation method of an electronic device according to an embodiment.

Referring to FIG. 6, in operation 601, the processor 120 of the electronic device 101 may detect a trigger related to an operation of the UDC module 400. According to an embodiment, the processor 120 may detect a designated trigger to operate (or execute) the UDC module 400 based on an input from a user. For example, the processor 120 may detect, as a trigger, service (or application or function) execution requiring an operation of the UDC module 400 to obtain an image related to an external object, such as fingerprint authentication, photographing the object, or face authentication in the electronic device 101.

In operation 603, the processor 120 may identify the operation mode (for example, the first designated operation mode or the second designated operation mode) of the UDC module 400. According to an embodiment, the processor 120 may identify the operation mode based on the detection of the trigger for an operation of the UDC module 400. According to an embodiment, the processor 120 may identify the operation mode based on whether an operation of the UDC module 400 is for authentication or photographing purpose.

According to an embodiment, the processor 120 may determine a first designated operation mode when the use of the UDC module 400 is for authentication purpose. For example, the processor 120 may determine the first designated operation mode (for example, fingerprint recognition mode) when an operation of the sensor module 410 of the UDC module 400 is required. According to an embodiment, the processor 120 may determine a second designated operation mode when the use of the UDC module 400 is for photographing or face authentication purpose. For example, the processor 120 may determine the second designated operation mode (for example, photographing mode or face recognition mode) when an operation of the camera module 420 of the UDC module 400 is required.

According to an embodiment, the trigger for triggering the first designated operation mode (for example, the fingerprint recognition mode) may include, for example, an operation by the user to perform unlock through fingerprint recognition on a lockscreen of the electronic device 101 or an operation of performing authentication through fingerprint recognition for a service requiring user self-authentication, such as electronic payment (for example, the Samsung pay) or website login.

According to an embodiment, the user may perform fingerprint recognition by touching his or her finger on the UDC area of the display module 160. In an embodiment, the performing fingerprint recognition on the display module 160 may be executed through a long touch of the UDC area of the display module 160 (for example, longer than one second of time).

According to an embodiment, the trigger for triggering the second designated operation mode (for example, the photographing mode or face recognition mode) may include, for example, the operation of executing an application related to driving the camera module 420 of the electronic device 101 or the operation of performing authentication through face recognition for a service in which face recognition is configured as the user authentication method and user self-authentication is required.

In operation 605, the processor 120 may configure (or control) the light path of the UDC module 400 and transmittance of the UDC area based on an operation mode.

According to an embodiment, when the operation mode of the UDC module 400 is determined as the first designated mode, the processor 120 may control the UDC module 400 so that the UDC module 400 configures the light path for obtaining an image as a first path (for example, the first path D1 in FIG. 3) facing the sensor module 410. For example, when operating in the first designated operation mode, the processor 120 may control the direction of the prism 430 of the UDC module 400 to allow light having passed through the prism 430 and the lens 411 through the UDC area of the display module 160 to be incident to the first sensor 413 (for example, the fingerprint sensor).

According to an embodiment, based on the first path configuration of the UDC module 400, the processor 120 may obtain a first image (for example, fingerprint image) based on light transferred to the sensor module 410 through the first path after light from a light source of the display module 160 is reflected from an external object (for example, a finger) in the UDC area and incident through the UDC area of the display module 160.

According to an embodiment, when the designated operation mode is determined, the processor 120 may change (or configure) transmittance (for example, perform the visually transparent or opaque process to change the transmittance to the first transmittance or the second transmittance) based on the pixel on/off control of the UDC area of the display module 160 in parallel (or approximately concurrently), after, or before the operation of configuring the light path (for example, the first path or the second path) of the UDC module 400.

According to an embodiment, when the first designated operation mode is determined, the processor 120 may configure the light path of the UDC module 400 to the first path, and change (or configure) (for example, perform the visually opaque process) the transmittance to the first transmittance based on the pixel on control of the UDC area. According to an embodiment, the processor 120 may obtain a fingerprint image reflected from an external object (for example, a user finger) by light emitted by the UDC area by processing the UDC area to be visually opaque based on the pixel on control (for example, the first transmittance change) of the UDC area in the first designated operation mode. For example, in the first designated mode, the processor 120 may obtain a fingerprint image in the first transmittance (for example, in the visually opaque processed state) based on the pixel on control of the UDC area.

According to an embodiment, when the operation mode of the UDC module 400 is determined as the second designated mode, the processor 120 may control the UDC module 400 so that UDC module 400 configures the light path for obtaining an image as a second path (for example, the second path D2 in FIG. 4) facing the camera module 420. For example, when operating in the second designated operation mode, the processor 120 may control the direction of the prism 430 of the UDC module 400 to allow light having been reflected from an external object (for example, a subject or user face) and having passed through the prism 430 and the lens 421 through the UDC area of the display module 160 to be incident to the second sensor 423 (for example, the image sensor).

According to an embodiment, based on the second path configuration of the UDC module 400, the processor 120 may obtain a second image (for example, photograph image (for example, a subject or face image)) based on light transferred to the camera module 420 through the second path.

According to an embodiment, when the designated operation mode is determined, the processor 120 may change (or configure) transmittance (for example, perform the visually transparent or opaque process to change the transmittance to the first transmittance or the second transmittance) based on the pixel on/off control of the UDC area of the display module 160 in parallel (or approximately concurrently), after, or before the operation of configuring the light path (for example, the first path or the second path) of the UDC module 400.

According to an embodiment, when the second designated operation mode is determined, the processor 120 may configure the light path of the UDC module 400 to the second path, and change (or configure) (for example, perform visually transparent process) the transmittance to the second transmittance different from the first transmittance based on the pixel off control of the UDC area. According to an embodiment, the processor 120 may obtain a clearer and more accurate photographed image (for example, high-definition image) by processing the UDC area to be visually transparent based on the pixel off control (for example, the second transmittance change) of the UDC area in the second designated operation mode. For example, in the second designated mode, the processor 120 may obtain a photograph image in the second transmittance (for example, in the visually transparent processed state) based on the pixel off control of the UDC area.

According to an embodiment, in the first designated operation mode and/or the second designated operation mode, the processor 120 may provide an indicating object to the UDC area and/or a peripheral area of the UDC area sequentially or approximately concurrently to the transmittance configuration of the UDC area. According to an embodiment, the indicating object may be a display or user interface object for guiding the user to the position and/or to indicate the operation mode of the UDC module 400. For example, the indicating object may include indicating (for example, displaying) the UDS area in a designated color (for example, green, red, yellow, or blue) and/or indicating (for example, displaying) the peripheral area of the UDC area in a designated shape (for example, donut shape) and in a designated color (for example, green, red, yellow, or blue).

According to an embodiment, the indicating object, for example, may be displayed while the UDC module 400 is activated and may not be displayed while the UDC module 400 is inactivated. According to an embodiment, the indicating object may be used to implement a function for distinguishing the operation mode of the UDC module 400. For example, for the UDC area and/or the peripheral area of the UDC area, the indicating object may be provided to be displayed in a first color (for example, green) when the UDC module 400 is operated in the first designated operation mode, and displayed in a second color (for example, red) when the UDC module 400 is operated in the second designated operation mode so as to visually distinguish the operation mode of the UDC module 400.

Figure 7:
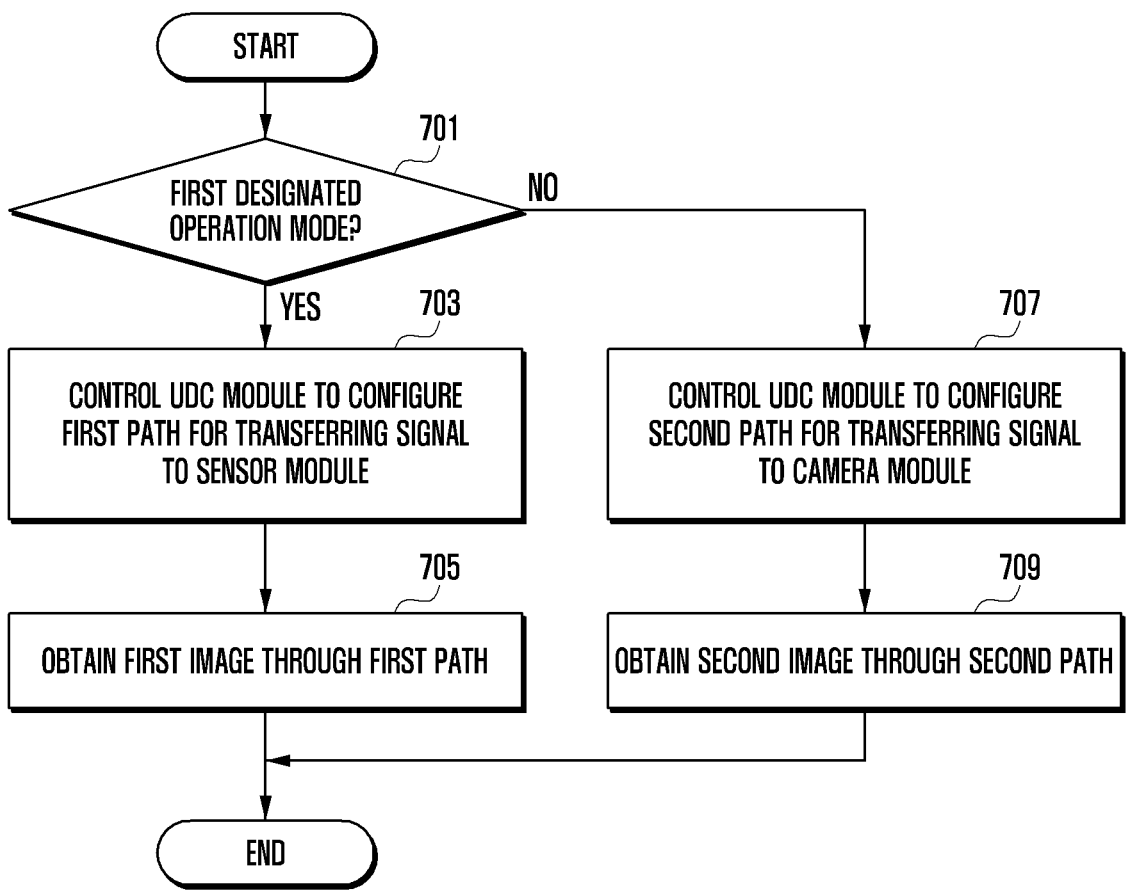
FIG. 7 is a flowchart illustrating an operation method of an electronic device according to an embodiment.

FIG. 7 is a flowchart illustrating an operation method of an electronic device according to an embodiment.

According to an embodiment, FIG. 7 may show an example of the operation of configuring the light path of the UDC module 400 based on a designated operation mode (for example, the first designated operation mode or the second designated operation mode) of the UDC module 400 and obtaining an image through the configured light path.

Referring to FIG. 7, in operation 701, the processor 120 of the electronic device 101 may determine whether the operation mode of the UDC module 400 is the first designated operation mode or the second designated operation mode. For example, how the processor 120 may identify the operation mode is described with reference to operation 603 of FIG. 6.

In operation 701, when determining the first designated operation mode (for example, "Yes" in operation 701), in operation 703, the processor 120 may control the UDC module 400 to configure a first path (for example, the first path D1 in FIG. 3) for transferring a signal (for example, light) to the sensor module 410 (for example, fingerprint sensor) of the UDC module 400. For example, the processor 120 may control the prism 430 of the UDC module 400 so that the UDC module 400 configures the light path for obtaining image to the first path. For example, the processor 120 may allow light having passed through the display module 160, the prism 430, and the lens 411 to be incident to the first sensor 413 (for example, a fingerprint sensor), based on control the direction of the prism 430.

In operation 705, the processor 120 may obtain a first image (for example, fingerprint image) using the first path. According to an embodiment, based on the first path configuration of the UDC module 400, the processor 120 may obtain a first image (for example, fingerprint image) based on light transferred to the sensor module 410 along the first path after a light source of the display module 160 is reflected from an external object (for example, a finger) in the UDC area of the display module 160 and incident through the UDC area.

In operation 701, when determining the second designated operation mode (for example, "No" in operation 701), in operation 707, the processor 120 may control the UDC module 400 to configure a second path (for example, the second path D2 in FIG. 4) for transferring a signal (for example, light) to the camera module 420 (for example, image sensor) of the UDC module 400. For example, the processor 120 may control the prism 430 of the UDC module 400 so that the UDC module 400 configures a light path for obtaining an image to the second path. For example, the processor 120 may allow light having passed through the display module 160, the prism 430, and the lens 421 to be incident to the second sensor 423 (for example, an image sensor), based on control the direction of the prism 430.

In operation 709, the processor 120 may obtain a second image (for example, photograph image such as subject or face image) using the second path. According to an embodiment, based on the second path configuration of the UDC module 400, the processor 120 may obtain a second image (for example, photograph image) based on the light that is reflected from an external object (for example, a subject of user face) outside of the electronic device 101, incident through the UDC area of the display module 160, and transferred to the camera module 420 along the second path.

Figure 8:
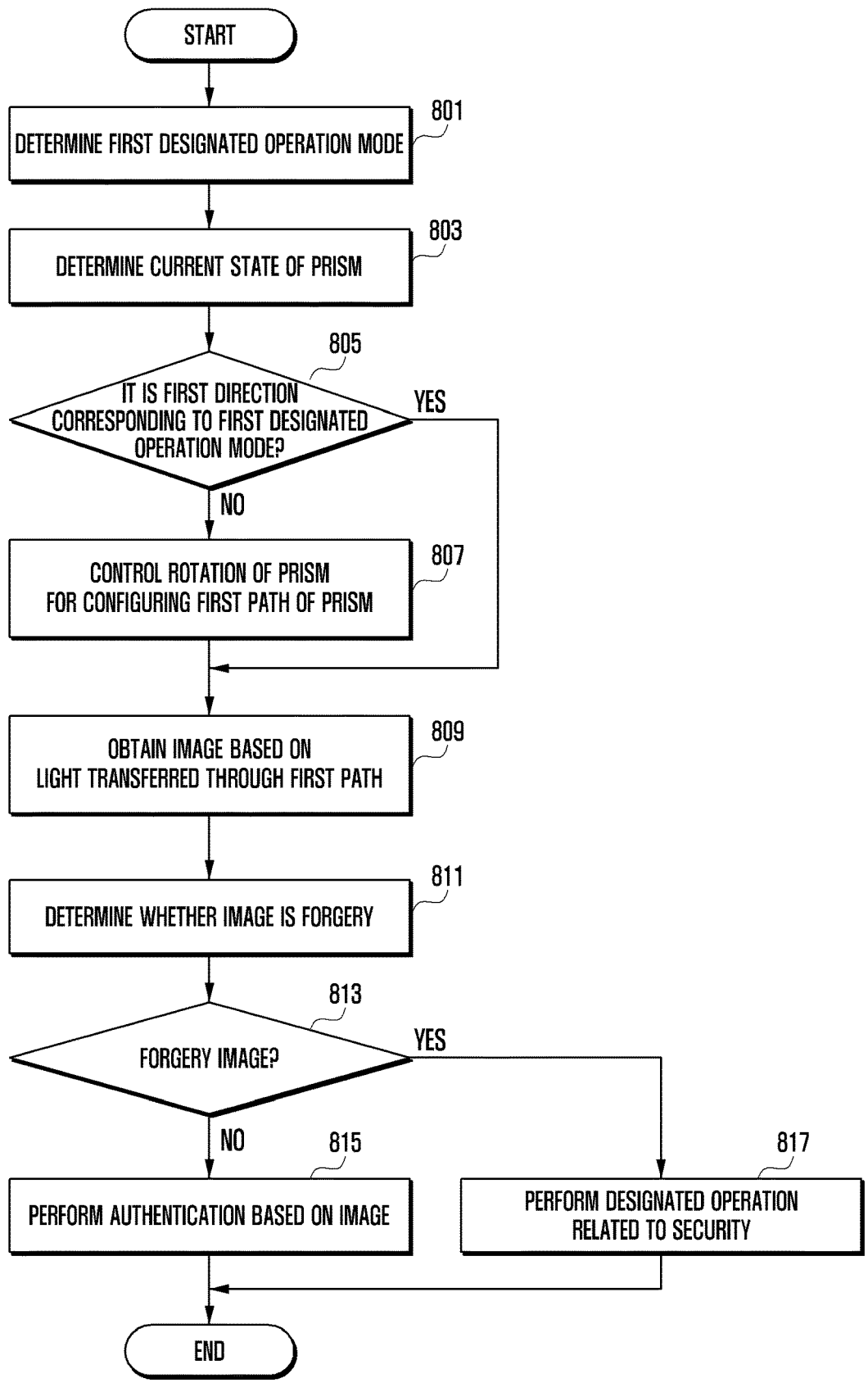
FIG. 8 is a flowchart illustrating an operation method of an electronic device according to an embodiment.

FIG. 8 is a flowchart illustrating an operation method of an electronic device according to an embodiment.

According to an embodiment, FIG. 8 may show an example of the operation of obtaining a fingerprint image based on control of the UDC module 400 for the first designated operation mode of the UDC module 400 and performing fingerprint authentication based on the obtained fingerprint image.

Referring to FIG. 8, in operation 801, the processor 120 of the electronic device 101 may determine the first designated operation mode.

In operation 803, the processor 120 may determine the current state of the prism 430 in the UDC module 400. For example, the processor 120 may identify the path in which the prism 430 is currently facing (for example, the direction in which the prism 430 faces).

In operation 805, the processor 120 may determine whether the prism 430 faces a first direction corresponding to the first designated operation mode of the UDC module 400 or faces a second direction corresponding to the second designated operation mode, based on the determination result of the current state of the prism 430. For example, the processor 120 may determine whether the prism 430 is in the first path configuration state or the second path configuration state.

In operation 805, when the direction of the prism 430 is determined to be the first direction (for example, "Yes" in operation 805), the processor 120 may proceed with operation 809 and perform operations following operation 809.

In operation 805, when the direction of the prism 430 is determined to be not the first direction (for example, "No" in operation 805), for example, when the direction of the prism 430 is the second direction, the processor 120 may control the rotation of the prism 430 to configure the first path of the prism 430 in operation 807. For example, the processor 120 may control the direction of the prism 430 to be rotated (for example, light path control through the rotation control of the prism 430 based on the current state (for example, the direction) of the prism 430) so that the UDC module 400 configures the light path for obtaining an image as the first path facing the sensor module 410.

In operation 809, the processor 120 may obtain an image (for example, fingerprint image) based on light transferred through the first path. According to an embodiment, the processor 120 may control obtaining an image (for example, fingerprint image) using light transferred through the prism 430 and the lens 411 via the first path of the UDC module 400 by using the sensor module 410.

In operation 811, the processor 120 may perform a designated operation for determining whether the obtained image is a forgery. According to an embodiment, the processor 120 may analyze whether the obtained image (for example, fingerprint image) corresponds to a pre-configured reference condition, or analyze whether the obtained image corresponds to the pre-configured reference condition by controlling (for example, changing the direction of the prism 430) an operation of the UDC module 400 and using a photograph image obtained through the camera module 420. For example, the processor 120 may determine whether the image (for example, fingerprint image) obtained on the first path is a forgery, at least based on the fingerprint image and/or the photograph image. The description in relation to the operation of determining whether the image is a forgery according to an embodiment will be given with reference to a drawing to be described below.

In operation 813, the processor 120 may determine whether the obtained image is a forgery. According to an embodiment, the processor 120 may determine whether the image corresponds to a forgery image, based on a result of the operation of determining whether the image is a forgery.

The processor 120 may perform an authentication operation based on the obtained image (for example, fingerprint image) in operation 815 when it is determined that the image is not a forgery (for example, "No" in operation 813), for example, when the obtained image is determined to be a normal image. The description in relation to the operation of authenticating using an image according to an embodiment will be given with reference to a drawing to be described below.

In operation 813, when the image is determined to be a forgery (for example, "Yes" in operation 813), the processor 120 may perform a designated operation related to security in operation 817. According to an embodiment, when the image is determined to be a forgery, the processor 120 may stop execution of the first designated operation mode (for example, the fingerprint recognition mode) and control a corresponding component (for example, the display module 160, the audio output module 155, and/or the haptic module 179) to output a designated notification with visual, auditory, and tactile information to indicate that a forged fingerprint is detected.

Figure 9:
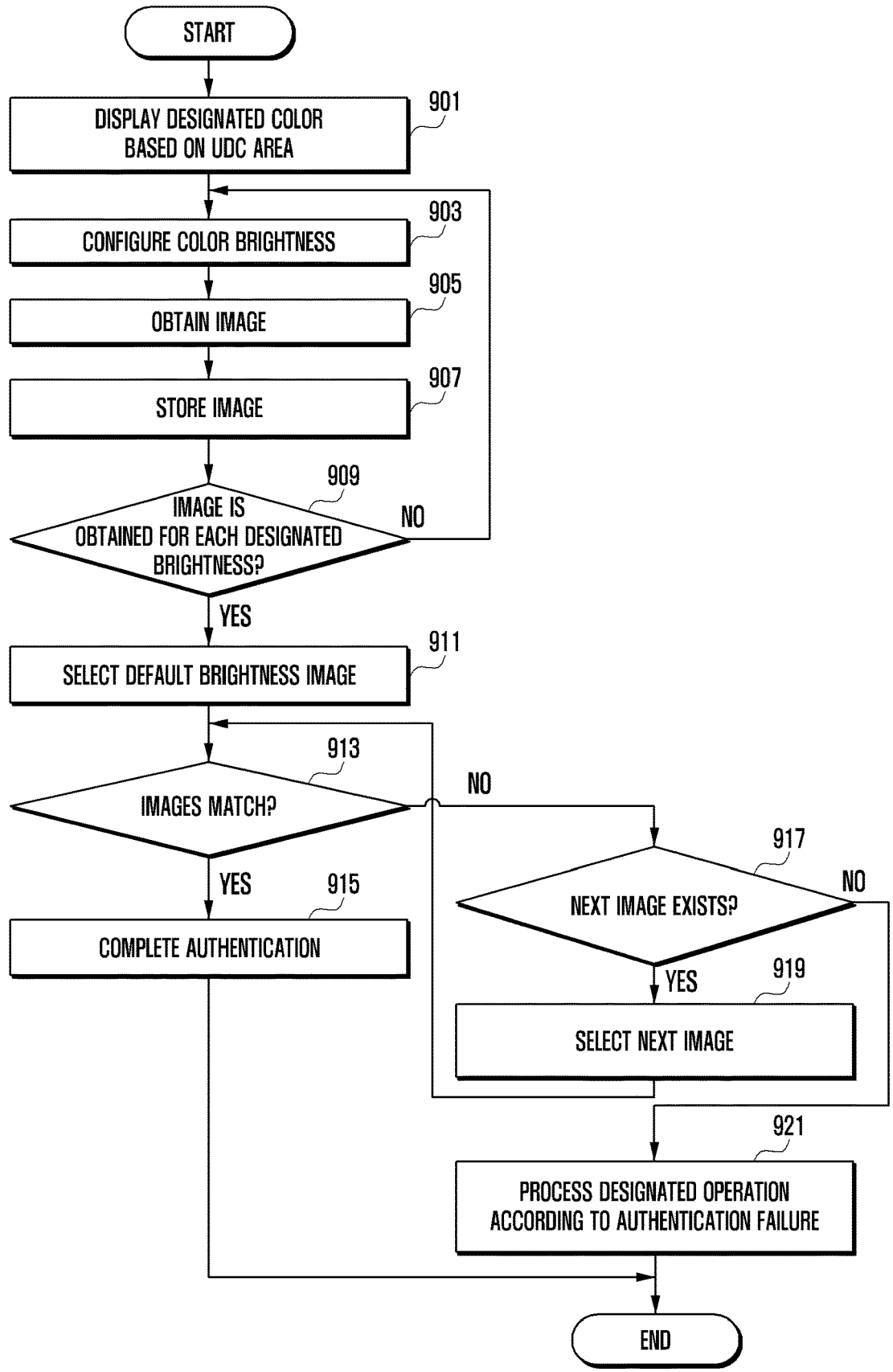
FIG. 9 is a flowchart illustrating an operation method of an electronic device according to an embodiment.

FIG. 9 is a flowchart illustrating an operation method of an electronic device according to an embodiment.

Figure 10:
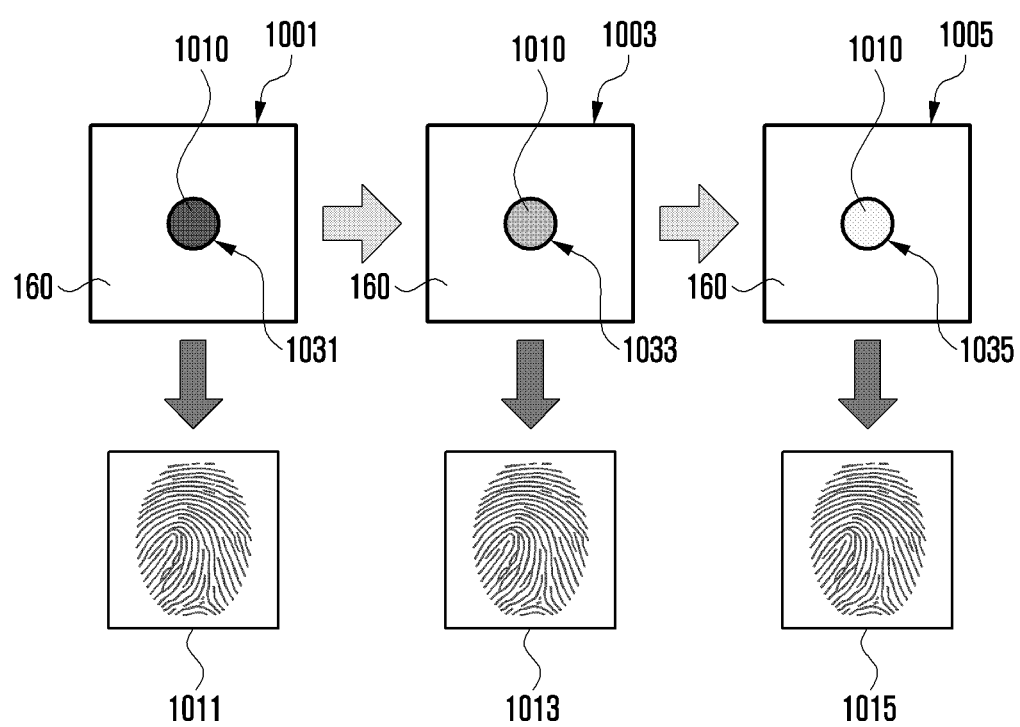
FIG. 10 is a view illustrating an example of an operation of obtaining an image according to brightness of a light source according to an embodiment.

FIG. 10 is a view illustrating an example of an operation of obtaining an image according to brightness (for example, intensity) of a light source according to an embodiment.

According to an embodiment, FIG. 9 may show an example of an operation of performing fingerprint authentication by using an image obtained in the first designated operation mode of the UDC module 400.

Referring to FIG. 9, in operation 901, the processor 120 of the electronic device 101 may control the display module 160 to display a designated color based on the pixel on control of the UDC area (for example, the UDC area 350 in FIG. 3 and FIG. 4) of the display module 160. According to an embodiment, the processor 120 may provide the UDC area with a designated color (for example, green, red, yellow, or blue) to obtain a clear image for improving fingerprint recognition performance and/or prevent burn-in of the display module 160.

In operation 903, the processor 120 may configure brightness of the designated color. According to an embodiment, the processor 120 may configure the brightness of the color to be a default brightness.

In operation 905, the processor 120 may obtain an image (for example, first fingerprint image) incident to the sensor module 410 based on the default brightness of the designated color. According to an embodiment, the processor 120 may obtain the first fingerprint image based on light transferred to the sensor module 410 through the first path after light of the default brightness in the designated color from a light source is reflected from an external object (for example, a finger) on the UDC area.

In operation 907, the processor 120 may store the obtained image (for example, first fingerprint image). According to an embodiment, the processor 120 may temporarily store the first fingerprint image obtained at the default brightness in a designated area (for example, the security area 135) of the memory 130.

In operation 909, the processor 120 may determine whether images is obtained for various levels of designated brightness (e.g. brightness at various designated numbers).

According to an embodiment, in order to prevent image quality degradation due to brightness reduction caused by deterioration of the display module 160 and/or the ambient brightness of the surrounding environment (for example, day, night, indoors, or outdoors) during the particular time of day at which authentication is required, one or more images may be obtained by sequentially changing light source brightness of the UDC area (for example, brightness of the designated color of the UDC area) in the display module 160. For example, the processor 120 may obtain a designated number of images corresponding to a designated number of times while sequentially changing brightness (for example, increasing light source brightness) of the designated color. An example thereof is shown in FIG. 10.

FIG. 10 may show an example in which the designated number of times corresponds to 3 and three images are obtained. According to an embodiment, the processor 120 may display the UDC area 1010 with a designated color (for example, green) in the display module 160. According to an embodiment, the processor 120 may obtain and store a first fingerprint image 1011 at first brightness 1031 (for example, default brightness) of the designated color in a first operation. According to an embodiment, the processor 120 may obtain and store a second fingerprint image 1013 at second brightness 1033 (for example, brightness relatively brighter than the first brightness) of the designated color in a second operation.

According to an embodiment, the processor 120 may obtain and store a third fingerprint image 1015 at third brightness 1035 (for example, brightness relatively brighter than the second brightness) of the designated color in a third operation. For example, the processor 120 may obtain and store the designated number (for example, three) of images corresponding to designated times while sequentially changing (for example, increasing light source brightness) color brightness of the designated color at the designated number of times (for example, three times).

Referring to FIG. 9 again, when not all images for designated brightness have been obtained (for example, "No" in operation 909), in operation 909, the processor 120 may proceed with operation 903 and perform operations following operation 903.

In operation 909, when all images for designated brightness have been obtained (for example, "Yes" in operation 909), in operation 911, the processor 120 may select an image (for example, a first fingerprint image) obtained based on a default brightness (for example, first brightness).

In operation 913, the processor 120 may perform image matching related to authentication based on the selected image. According to an embodiment, the processor 120 may compare the selected image with a pre-registered reference image and determine whether authentication succeeds, based on matching or non-matching thereof (for example, where the images are of sufficient similarity).

When the matching succeeds in operation 913 (for example, "Yes" in operation 913), the processor 120 may complete authentication in operation 915. According to an embodiment, the processor 120 may process a designated operation or function, such as unlocking the device through fingerprint recognition or authentication operation through fingerprint recognition in a service requiring user self-authentication) based on the image matching success.

When the matching fails in operation 913 (for example, "No" in operation 913), the processor 120 may check existence of a next image in operation 917. For example, the processor 120 may identify whether an image stored at different brightness exists among multiple temporarily stored images.

When there are no more images (for example, "No" in operation 917) in operation 917, the processor 120 may perform a designated operation according to the authentication failure in operation 921. According to an embodiment, the processor 120 may control a corresponding component (for example, the display module 160, the audio output module 155, and/or the haptic module 179) to output, with visual, auditory, and tactile information, a designated notification related to authentication failure.

When the next image exists (for example, "Yes" in operation 917) in operation 917, in operation 919, the processor 120 may select the next image (for example, an image (for example, a second fingerprint image) of next brightness (for example, second brightness)) and proceed with operation 913 to perform operations following operation 913.

According to an embodiment, the processor 120 may obtain designated number of images for each designated brightness and retry authentication for images at different brightnesses when authentication for an obtained image with default brightness fails. For example, the processor 120 may obtain multiple images while changing brightness of the designated color and improve authentication success rate. According to an embodiment, the processor 120 may obtain different optimal images while changing brightness and color together. For example, in the above example of three images, a first image is obtained based on a first color and first brightness, a second image is obtained based on a second color and second brightness, and a third image is obtained based on a third color and third brightness.

Figure 11:
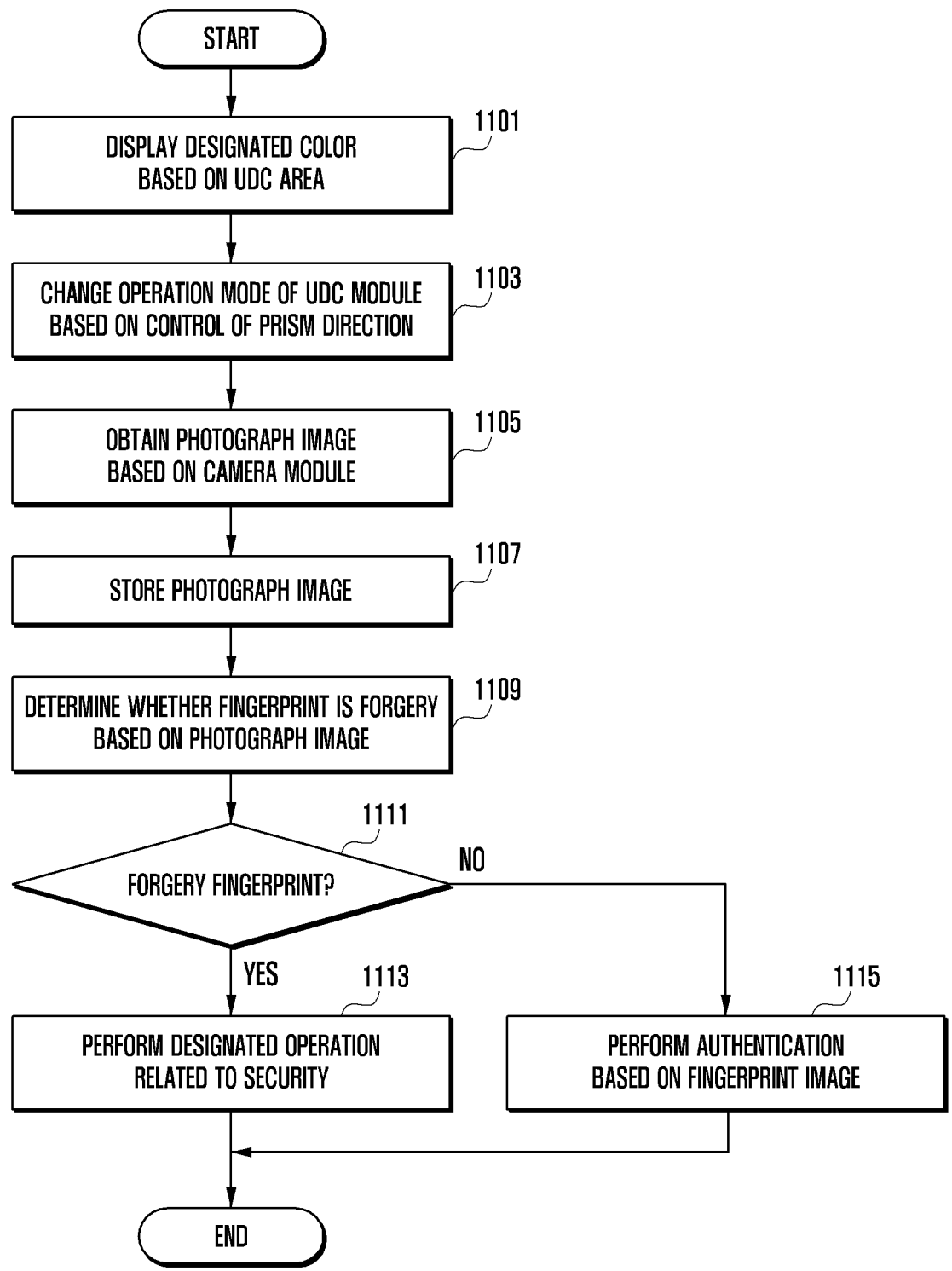
FIG. 11 is a flowchart illustrating an operation method of an electronic device according to an embodiment.

FIG. 11 is a flowchart illustrating an operation method of an electronic device according to an embodiment.

Figure 12:
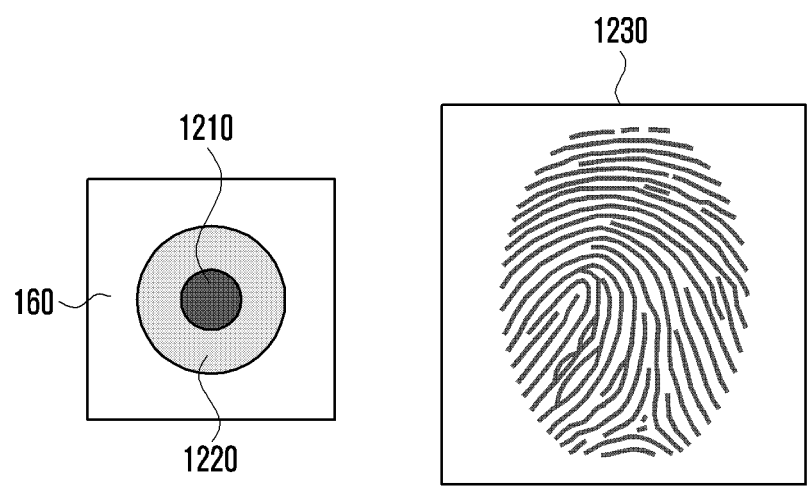
FIG. 12 is a view illustrating an example of an operation of identifying a forgery fingerprint according to an embodiment.
Figure 12:
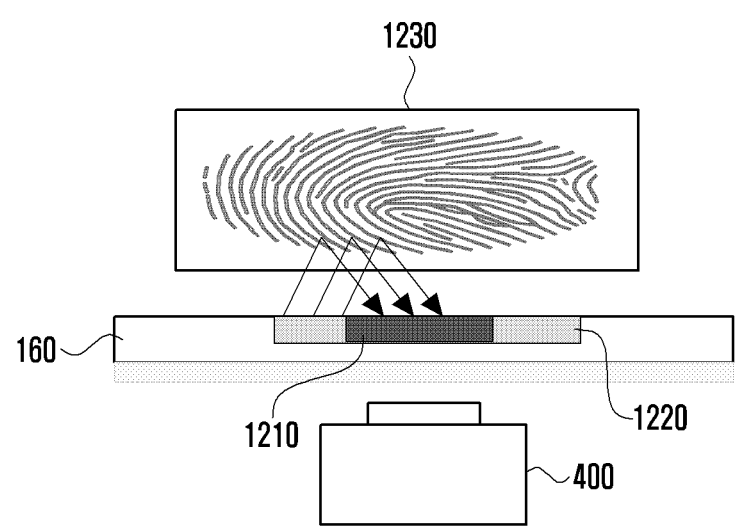

FIG. 12 is a view illustrating an example of an operation of identifying a forgery fingerprint according to an embodiment.

Figure 13A:
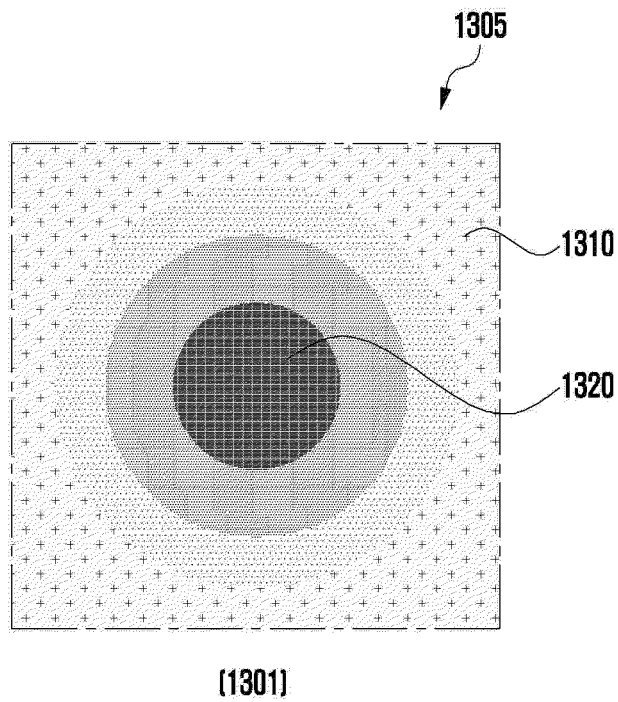
FIG. 13A is a view illustrating an example of an operation of identifying a forgery fingerprint according to an embodiment.
Figure 13A:
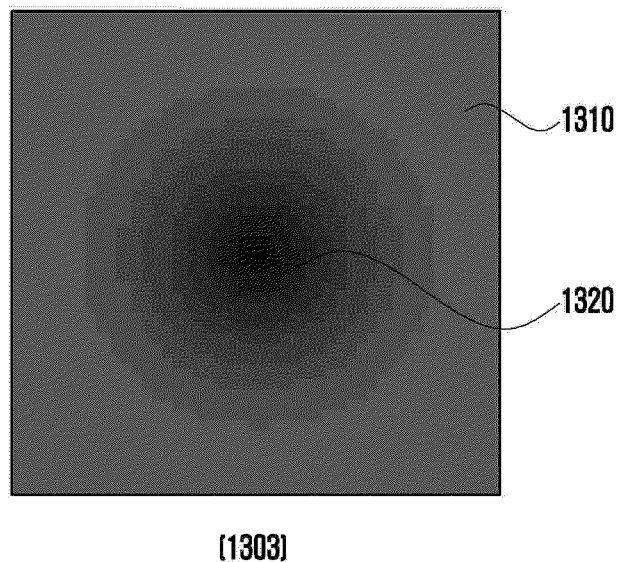
Figure 13B:
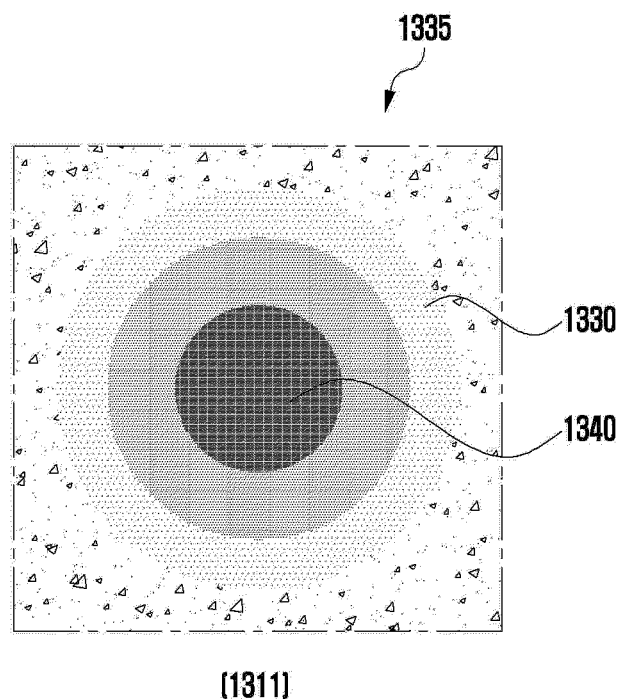
FIG. 13B is a view illustrating an example of an operation of identifying a forgery fingerprint according to an embodiment.
Figure 13B:
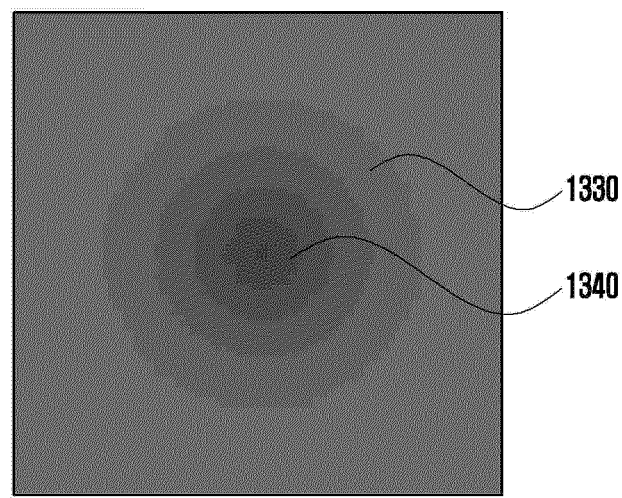

FIG. 13A and FIG. 13B are views illustrating examples of an operation of identifying a forgery fingerprint according to an embodiment.

According to an embodiment, FIG. 11 may show an example of an operation of determining whether an image obtained in the first designated operation mode of the UDC module 400 is a forgery fingerprint or forged fingerprint. According to an embodiment, the forgery fingerprint determination operation according to FIG. 11 may be performed after obtaining an image through the first path. According to an embodiment, the forgery fingerprint determination operation may allow forgery fingerprint determination to be performed when the first designated operation mode starts before an image is obtained through the first path and an image may be obtained through the first path according to the result thereof.

Referring to FIG. 11, in operation 1101, the processor 120 of the electronic device 101 may control the display module 160 to display a designated color based on the pixel on control of the UDC area (for example, the UDC area 350 in FIG. 3 and FIG. 4) of the display module 160. According to an embodiment, the processor 120 may visually provide a periphery area of the UDC area in a designated color (for example, red) and designated shape (for example, a donut shape surrounding the UDC area) sequentially or approximately concurrently to transmittance changing or configuring (for example, visually opaque process) the UDC area corresponding to the UDC module 400 in the display module 160. According to an embodiment, the processor 120 may show, to the user, an operation mode change guide and/or an indicating object for providing a designated light source through the periphery area of the UDC area. For example, the processor 120 may display the periphery area of the UDC area in a display area of the display module 160 in a designated shape (for example, donut shape) and a designated color (for example, green, red, yellow, or blue).

In operation 1103, the processor 120 may change an operation mode of the UDC module 400 based on control of the direction of the prism 430. According to an embodiment, the processor 120 may control the direction of the prism 430 from the currently configured first path of the UDC module 400 to the second path for obtaining photograph images by the camera module 420. According to an embodiment, when the operation mode is changed (for example, change from the first designated operation mode to the second designated operation mode), the processor 120 may process the UDC area to be visually transparent based on the pixel off control of the UDC area.

In operation 1105, the processor 120 may obtain a photograph image based on the camera module 420. According to an embodiment, the processor 120 may obtain an image (for example, photograph image) using light transferred through the prism 430 and the lens 421 on the second path of the UDC module 400 by using the camera module 420.

In operation 1107, the processor 120 may store the photograph image. According to an embodiment, the processor 120 may temporarily store the obtained photograph image in a designated area (for example, the security area 135) of the memory 130.

In operation 1109, the processor 120 may determine whether a fingerprint image (for example, the image obtain through the first path according to the first designated operation mode) is a forgery based on the photograph image. According to an embodiment, the processor 120 may determine whether the image is a forgery based on color distribution (for example, skin color information) analysis. An example thereof is shown in FIG. 12, FIG. 13A, and FIG. 13B.

FIG. 12 may show an embodiment for determining whether a fingerprint image is a forgery. According to an embodiment, the processor 120 may configure the UDC area 1210 to be transparent by means of the pixel off control of the UDC area 1210 in the display module 160 and display the periphery area 1220 of the UDC area 1210 in a designated shape (for example, donut shape) and in a designated color (for example, green, red, yellow, and blue). According to an embodiment, referring to FIG. 13A, when an external object 1230 disposed on the UDC area 1210 is a user finger, the corresponding photograph image 1305 may have, for example, color distribution (for example, skin color information) of embodiment 1301 in FIG. 13A. In another embodiment, when an external object 1230 disposed on the UDC area 1210 is not a live object, for example when the external object 1230 is a photograph of a fingerprint, the photograph image 1305 may have, for example, color distribution of embodiment 1303 in FIG. 13A.

For example, in the case of real skin of the user, the color distribution of the photograph image 1305 may have a center area 1320 distinguished from a periphery area 1310 and show a designated color. On the other hand, in the case of a fake fingerprint, there may be no light reflection by the object 1230 for light from a light source of the periphery area 1220, and thus the photograph image 1305 may appear generally dark without distinction between the periphery area 1310 and the center area 1320. According to an embodiment, the processor 120 may determine forgery or not with respect to an image from the external object 1230 disposed on the UDC area 1210 based on color distribution of the photograph image 1305 described above.

According to an embodiment, although FIG. 12 shows an embodiment in which forgery is determined by using the photograph image 1305, embodiments of the instant disclosure are not limited thereto. According to another embodiment, referring to FIG. 13B, the processor 120 may determine forgery by using the fingerprint image 1335 obtained through the first path in the first designated operation mode without change of operation modes (for example, changing from the first designated operation mode to the second designated operation mode).

For example, as shown in FIG. 13B, the processor 120 may process the UDC area 1210 to be opaque by means of the pixel on control of the UDC area 1210, and obtain a fingerprint image reflected by light from the on pixels of the UDC area 1210. For example, when an external object 1230 disposed on the UDC area 1210 is a user finger, the fingerprint image 1335 may have, for example, color distribution of embodiment 1311 in FIG. 13B. In another embodiment, when an external object 1230 disposed on the UDC area 1210 is a fake image, the fingerprint image 1335 may have, for example, color distribution of embodiment 1313 in FIG. 13B.

For example, in the case of real skin of the user, image distribution of the fingerprint image 1335 may have a center area 1340 distinguished from a periphery area 1330. On the other hand, in the case of a faked fingerprint image, there may be no light reflection by the object 1230 for light from a light source of the periphery area 1220, and thus the fingerprint image 1335 may appear generally dark without distinction between the periphery area 1330 and the center area 1340.

Referring to FIG. 11 again, in operation 1111, the processor 120 may determine whether the image corresponds to a forgery fingerprint or normal fingerprint, based on a result of the operation of determining whether the image is a forgery.

In operation 1111, when it is determined that the image is a forgery fingerprint (for example, "Yes" in operation 1111), the processor 120 may perform a designated operation related to security in operation 1113. According to an embodiment, when the image is determined to be a forgery fingerprint, the processor 120 may stop execution of the first designated operation mode (for example, fingerprint recognition mode) and control a corresponding component (for example, the display module 160, the audio output module 155, and/or the haptic module 179) to output a designated notification related to a forgery fingerprint with visual, auditory, and tactile information.

When it is determined that the image is a normal fingerprint (for example, "No" in operation 1111) in operation 1111, the processor 120 may perform an authentication operation based on the obtained image (for example, a fingerprint image) in operation 1115.

Figure 14:
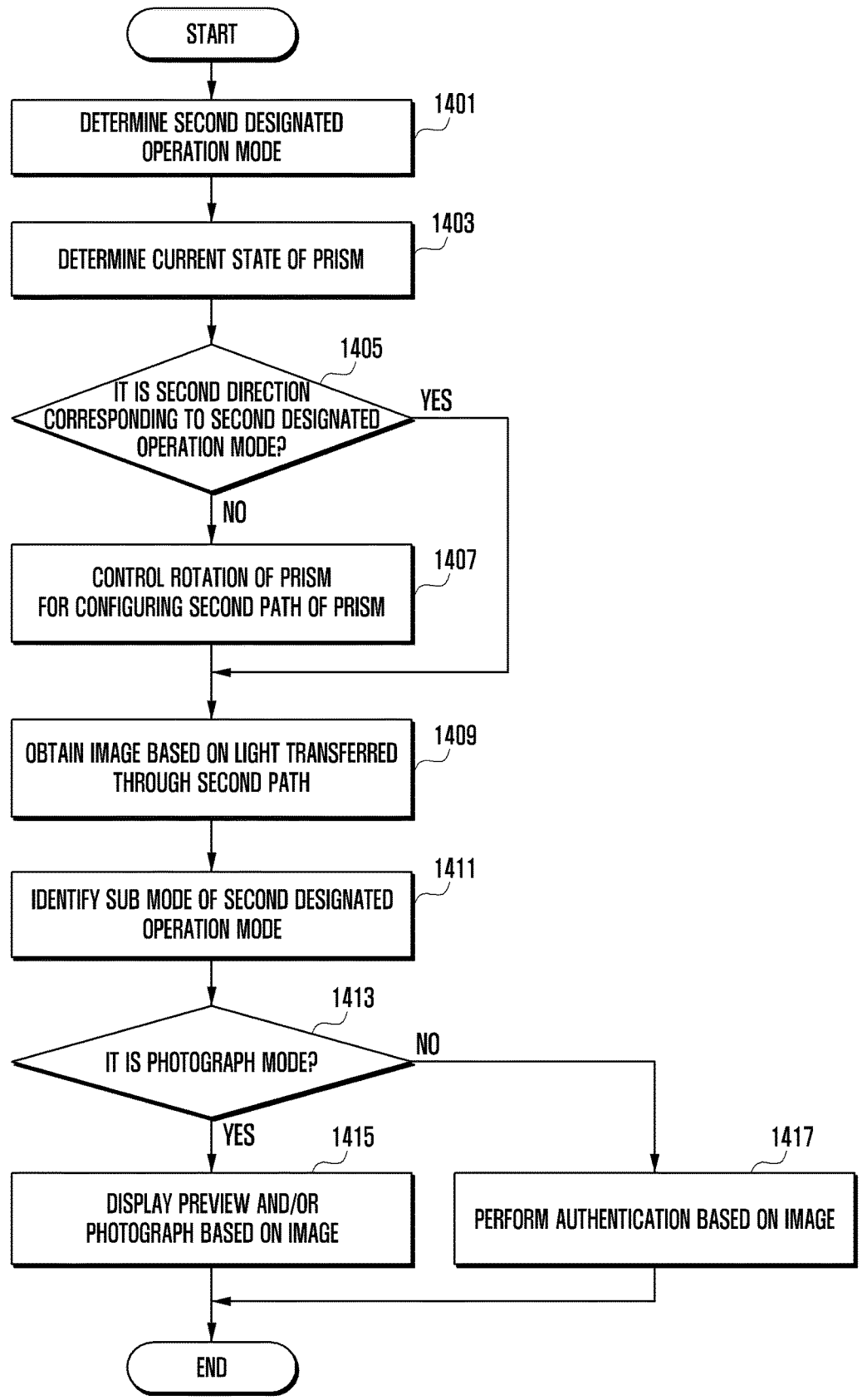
FIG. 14 is a flowchart illustrating an operation method of an electronic device according to various embodiments.

FIG. 14 is a flowchart illustrating an operation method of an electronic device according to an embodiment.

According to an embodiment, FIG. 14 may show an example of an operation of obtaining a photograph image based on control of the UDC module 400 in the second designated operation mode of the UDC module 400.

Referring to FIG. 14, in operation 1401, the processor 120 of the electronic device 101 may determine the second designated operation mode.

In operation 1403, the processor 120 may determine the current state of the prism 430 in the UDC module 400. For example, the processor 120 may identify the current path in which the prism 430 is facing (for example, the direction in which the prism 430 faces).

In operation 1405, the processor 120 may determine whether the prism 430 faces the first direction corresponding to the first designated operation mode of the UDC module 400 or faces the second direction corresponding to the second designated operation mode, based on the determination result of the current state of the prism 430. For example, the processor 120 may determine whether the prism 430 is in the first path configuration state or the second path configuration state.

In operation 1405, when it is determined that the direction of the prism 430 is the second direction (for example, "Yes" in operation 1405), the processor 120 may proceed with operation 1409 and perform operations following operation 1409.

In operation 1405, when it is determined that the direction of the prism 430 is not the second direction (for example, "No" in operation 1405), for example, when the direction of the prism 430 is the first direction, the processor 120 may control the rotation of the prism 430 to configure the second path of the prism 430 in operation 1407. For example, the processor 120 may control the direction of the prism 430 to be rotated (for example, light path control through the rotation control of the prism 430 based on the current state (for example, the direction) of the prism 430) so that the UDC module 400 configures the light path for obtaining images as the second path facing the camera module 420.

In operation 1409, the processor 120 may obtain an image (for example, photograph image) based on light transferred through the second path. According to an embodiment, the processor 120 may control obtaining an image (for example, photograph image) using light transferred through the prism 430 and the lens 421 on the second path of the UDC module 400 by using the camera module 420.

In operation 1411, the processor 120 may identify a sub mode of the second designated operation mode. According to an embodiment, the sub mode of the second designated operation mode may include, for example, a photograph mode and a face recognition mode, and the processor 120 may determine whether the sub mode of the second designated operation mode is the photograph mode or the face recognition mode based on a user input.

In operation 1413, the processor 120 may determine whether the second designated operation mode is the photograph mode or the face recognition mode based on a result of identifying the sub mode.

When the photograph mode is determined (for example, "Yes" in operation 1413) in operation 1413, the processor 120 may perform preview displaying and/or photographing operation, based on the obtained image (for example, photograph image) in operation 1415.

When the face recognition mode is determined (for example, "No" in operation 1413) in operation 1413, the processor 120 may perform an authentication operation based on the obtained image (for example, photograph image) in operation 1417. For example, the processor 120 may perform an authentication operation based on face recognition by using the photograph image.

An operation method of an electronic device 101 according to an embodiment of the disclosure may include an operation of detecting a trigger related to an operation of an under display camera (UDC) module 400, an operation of identifying an operation mode of the UDC module 400 based on the trigger detection, an operation of changing transmittance of a UDC area corresponding to a position of the UDC module in a display area of the display module 160 to a first transmittance when the operation mode is a first designated operation mode and controlling the UDC module 400 to configure a first path facing the sensor module 410 of the UDC module 400, an operation of obtaining a first image based on light transferred to the sensor module 410 through the first path after light from the display module 160 is reflected from a first external object on the UDC area, an operation of changing the transmittance of the UDC area corresponding to the position of the UDC module in the display area of the display module to a second transmittance different from the first transmittance when the operation mode is a second designated operation mode and controlling the UDC module to configure a second path facing the camera module 420 of the UDC module 400, and an operation of obtaining a second image based on light reflected from a second external object outside of the electronic device 101 and transferred to the camera module 420 through the second path.

According to an embodiment, the operation of changing transmittance of the UDC area may include an operation of controlling the display module 160 to turn on pixels in the UDC area and/or a periphery area of the UDC area in a designated color and designated brightness.

According to an embodiment, the operation of changing transmittance of the UDC area may include an operation of processing the UDC area to be visually opaque based on the pixel on control of the UDC area in the first designated operation mode so as to change the transmittance of the UDC area to the first transmittance, or an operation of processing the UDC area to be visually transparent by the pixel off control of the UDC area in the second designated operation mode so as to change the transmittance of the UDC area to the second transmittance.

According to an embodiment, the operation method of an electronic device 101 may include an operation of controlling the rotation of the prism 430 to obtain the first image in the first designated operation mode and change the currently configured first path of the UDC module 400 to the second path, an operation of obtaining a photograph image using light transferred through the second path of the UDC module 400 by using the camera module 420, and an operation of determining whether the first image is a forgery, based on the photograph image.

The embodiments disclosed in the specification and the drawings are merely presented as specific examples to easily explain the technical features and help understanding of the disclosure and are not intended to limit the scope of the disclosure. Therefore, the scope of the disclosure should be construed as encompassing all changes or modifications derived from the technical ideas of the disclosure in addition to the embodiments disclosed herein.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:
1. An electronic device comprising:
a display module;
an under display camera (UDC) module comprising a camera module and a sensor module and formed under the display module; and
a processor,
wherein the processor is configured to:
detect a trigger related to an operation of the UDC module,
identify an operation mode of the UDC module based on the trigger detection,
change a transmittance of a UDC area corresponding to a position of the UDC module in a display area of the display module to a first transmittance when the operation mode is a first designated operation mode and control the UDC module to configure a first path facing the sensor module,
obtain a first image based on light transferred to the sensor module through the first path after light from the display module is reflected from a first external object on the UDC area,
change the transmittance of the UDC area corresponding to the position of the UDC module in the display area of the display module to a second transmittance different from the first transmittance when the operation mode is a second designated operation mode and control the UDC module to configure a second path facing the camera module, and
obtain a second image based on light reflected from a second external object outside of the electronic device and transferred to the camera module through the second path.

2. The electronic device of claim 1,
wherein the sensor module and the camera module of the UDC module are disposed in an inner space of a housing and disposed to at least partially face each other in a horizontal direction.

3. The electronic device of claim 2,
wherein the UDC module comprises a prism rotatably disposed so that one surface thereof faces a direction of the display module in the inner space of the housing and another surface thereof faces the sensor module or the camera module,
wherein the sensor module of the UDC module comprises at least one first lens, and at least one first sensor disposed to obtain at least a portion of light having passed through the prism and the at least one first lens in the inner space of the housing, and
wherein the camera module of the UDC module comprises multiple second lenses aligned at predetermined intervals, and at least one second sensor disposed to obtain at least a portion of light having passed through the prism and the multiple second lenses in the inner space of the housing.

4. The electronic device of claim 3,
wherein the prism is shared by the sensor module and the camera module and is configured to change a progress direction of the light having passed through the prism based on whether the operation mode is the first designated operation mode or the second designated operation mode.

5. The electronic device of claim 3,
wherein the at least one first sensor comprises an optical fingerprint sensor configured to obtain a fingerprint image of the first external object coming in contact with the UDC area.

6. The electronic device of claim 1, wherein the processor is configured to:
control the display module to display an indicating object in a peripheral area of the UDC area, and
wherein the indicating object is configured to guide a user to the position of the UDC module and/or to indicate the operation mode and is displayed while the UDC module is activated.

7. The electronic device of claim 6, wherein the processor is configured to:
control the display module to turn on pixels in the UDC area and/or the peripheral area in a designated color and designated brightness.

8. The electronic device of claim 7, wherein the processor is configured to:
sequentially change the designated brightness of the UDC area according to a designated number of times and obtain a designated number of fingerprint images corresponding to the designated number of times.

9. The electronic device of claim 8, wherein the processor is configured to:
perform authentication based on a first fingerprint obtained based on default brightness, and
sequentially perform authentication based on additional fingerprint images obtained based on brightnesses other than the default brightness when the authentication based on the first fingerprint fails.

10. The electronic device of claim 1, wherein the processor is configured to:
process the UDC area to be visually opaque based on pixel on control of the UDC area in the first designated operation mode so as to change the transmittance of the UDC area to the first transmittance, and
process the UDC area to be visually transparent by pixel off control of the UDC area in the second designated operation mode so as to change the transmittance of the UDC area to the second transmittance.

11. The electronic device of claim 3, wherein the processor is configured to:
rotate the prism of the UDC module to control light having passed through the UDC area of the display module, the prism, and the at least one first lens to be incident to the at least one first sensor when operating in the first designated operation mode, and
rotate the prism of the UDC module to control light having passed through the UDC area of the display module, the prism, and the multiple second lenses to be incident to the at least one second sensor when operating in the second designated operation mode.

12. The electronic device of claim 3, wherein the processor is configured to:
in the first designated operation mode, rotate a first surface of the prism to face the direction of the display module and a second surface of the prism to face the at least one first sensor to configure the first path in which light having been incident through the first surface is reflected from a third surface of the prism to pass through the second surface so as to be transferred to the at least one first sensor, and
in the second designated operation mode, rotate the second surface to face the direction of the display module and the first surface to face the at least one second sensor to configure a second path in which light having been incident through the second surface is reflected from the third surface to pass through the first surface so as to be transferred to the at least one second sensor.

13. The electronic device of claim 3, wherein the processor is configured to:
determine the operation mode of the UDC module based on whether an operation of the UDC module is for authentication or photographing,
identify a direction in which the prism in the UDC module is currently facing, in response to the determining of the operation mode, and
when the direction in which the prism is currently facing does not correspond to the operation mode, control rotation of the prism so as to change the direction of the prism.

14. The electronic device of claim 3, wherein the processor is configured to:
control rotation of the prism to change the currently configured first path of the UDC module to the second path in the first designated operation mode,
obtain a photograph image using light transferred through the second path of the UDC module by using the camera module, and
determine whether the first image is a forgery, based on the photograph image.

15. A method for operating an electronic device, the method comprising:
detecting a trigger related to an operation of an under display camera (UDC) module;
identifying an operation mode of the UDC module based on the trigger detection;
changing transmittance of a UDC area corresponding to a position of the UDC module in a display area of a display module to a first transmittance when the operation mode is a first designated operation mode and controlling the UDC module to configure a first path facing a sensor module of the UDC module;
obtaining a first image based on light transferred to the sensor module through the first path after light from the display module is reflected from a first external object on the UDC area;
changing the transmittance of the UDC area corresponding to the position of the UDC module in the display area of the display module to a second transmittance different from the first transmittance when the operation mode is a second designated operation mode and controlling the UDC module to configure a second path facing a camera module of the UDC module; and
obtaining a second image based on light reflected from a second external object outside of the electronic device and transferred to the camera module through the second path.

16. The method of claim 15, wherein the sensor module and the camera module of the UDC module are disposed in an inner space of a housing and disposed to at least partially face each other in a horizontal direction.

17. The method of claim 16,
wherein the UDC module comprises a prism rotatably disposed so that one surface thereof faces a direction of the display module in the inner space of the housing and another surface thereof faces the sensor module or the camera module,
wherein the sensor module of the UDC module comprises at least one first lens, and at least one first sensor disposed to obtain at least a portion of light having passed through the prism and the at least one first lens in the inner space of the housing, and wherein the camera module of the UDC module comprises multiple second lenses aligned at predetermined intervals, and at least one second sensor disposed to obtain at least a portion of light having passed through the prism and the multiple second lenses in the inner space of the housing.

18. The method of claim 15, further comprising:

sequentially changing a designated brightness of the UDC area a designated number of times and obtaining a designated number of fingerprint images corresponding to the designated number of times.

19. The method of claim 18, further comprising:

performing authentication based on a first fingerprint obtained based on default brightness; and sequentially performing authentication based on additional fingerprint images obtained based on brightnesses other than the default brightness when the authentication based on the first fingerprint fails.

20. The method of claim 17, further comprising:

controlling rotation of the prism to change the currently configured first path of the UDC module to the second path in the first designated operation mode, obtaining a photograph image using light transferred through the second path of the UDC module by using the camera module, and determining whether the first image is a forgery, based on the photograph image.

\* \* \* \* \*